United States Patent
Singer et al.

(10) Patent No.: US 6,745,187 B2
(45) Date of Patent: *Jun. 1, 2004

(54) ENVIRONMENTAL PERMIT WEB PORTAL

(75) Inventors: Gary Brian Singer, Ann Arbor, MI (US); Jeffrey Neal Adams, Alexandria, VA (US); Clay Wyatt Goldwein, McLean, VA (US)

(73) Assignee: American Management System, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/357,428

(22) Filed: Feb. 4, 2003

(65) Prior Publication Data

US 2003/0115198 A1 Jun. 19, 2003

Related U.S. Application Data

(63) Continuation of application No. 09/654,515, filed on Sep. 1, 2000.

(51) Int. Cl.$^7$ ............................................. G06F 17/30
(52) U.S. Cl. ..................... 707/9; 707/10; 707/102; 707/104.1; 709/203; 709/218; 715/513; 705/7
(58) Field of Search ..................... 707/104.1, 1–4, 707/9, 10, 102, 103; 715/501.1, 513; 705/1, 7, 9, 11, 28, 30, 38; 709/217, 218, 219, 203; 713/151, 154

(56) References Cited

U.S. PATENT DOCUMENTS

| | | | |
|---|---|---|---|
| 5,291,398 A | 3/1994 | Hagan | 364/408 |
| 5,532,928 A | 7/1996 | Stanczyk et al. | |
| 5,631,828 A | 5/1997 | Hagan | 395/204 |
| 5,664,112 A | 9/1997 | Sturgeon et al. | |
| 5,726,884 A | 3/1998 | Sturgeon et al. | |
| 5,765,140 A | 6/1998 | Knudson et al. | |
| 5,793,636 A | 8/1998 | Cooney et al. | |
| 5,808,916 A | 9/1998 | Orr et al. | |
| 5,828,751 A | * 10/1998 | Walker et al. | 713/175 |
| 5,864,685 A | 1/1999 | Hagan | 395/235 |
| 5,890,129 A | 3/1999 | Spurgeon | |
| 6,067,549 A | 5/2000 | Smalley et al. | |
| 6,085,976 A | 7/2000 | Sehr | 235/384 |
| 6,088,700 A | 7/2000 | Larsen et al. | 707/10 |
| 6,091,835 A | 7/2000 | Smithies et al. | 382/115 |
| 6,122,635 A | 9/2000 | Burakoff et al. | 707/102 |
| 6,256,640 B1 | 7/2001 | Smalley et al. | 707/104 |
| 6,260,044 B1 | 7/2001 | Nagral et al. | 707/102 |

OTHER PUBLICATIONS

U.S. patent application Ser. No. 09/528,718, Smalley et al., filed Mar. 20, 2000.

U.S. patent application Ser. No. 09/654,515, Singer et al., filed Sep. 1, 2000.

(List continued on next page.)

*Primary Examiner*—Shahid Alam
(74) *Attorney, Agent, or Firm*—Staas & Halsey LLP

(57) ABSTRACT

A system is disclosed that allows remote, regulated entity users web based access to authorization data, such as permit data in an environmental regulatory permitting or management system. The user can enter, edit and submit permit and compliance data in the environmental permitting system controlled by a regulating agency in real-time via a web browser over the Internet. The system can also validate submitted information in real-time and allows the user to correct the data. Electronic certification with a unique signature is also performed. Fee payment can be made electronically in real-time through the permitting system with an electronic payments system with a corresponding credit being made to the relevant department general ledger account.

7 Claims, 30 Drawing Sheets

OTHER PUBLICATIONS

"A Broker for Tracking, Delivering and Using Regulations Over the World Wide Web," Stasiak et al., Proceedings of the 1996 IEEE International Symposium on Electronics and the Environment, May 6–8, 1996, pp. 293–297.

Pen PC's Power Gas Company, John Longwell, Computer Reseller News, No. 628, pp. S15–S16l, May 1995.

Health and Safety Inspect Software Developed for Badger Ruggedized Handheld Computers. News Release, Mar. 14, 1994.

Improve Portable Monitor Selection. S Hennigan et al., Hydrocarbon Processing, vol. 74, N. 2, pp. 76(8) Feb. 1995.

The Age of Aquarius: Wetlands Take Center Stage. Beth Wade, American City & Country, vol. 109, No. 12, pp. 50(8), Nov. 1994.

"Grant Application & Management System—Version 6.01.95", North Carolina State University, pp. 12–29, Jun. 1995.

PDSI to Offer Maximo® Wireless in Jun. 1999. PR Newswire Boston, Mar. 15, 1999.

Wireless IP—A Case Study. Peter Rysavy, Rysavy Research for PCS Data Today online journal, Apr. 30, 1999.

Touring NPEM 1999: Information Technologies for Maintenance Management Show Promise, Innovation. Tom Singer, Tompkins Associates, Inc., Plant Engineering Magazine, May 1, 1999.

Penning Vertical Software. VARBusiness, Jun. 1994 p. 173 by Katherine Bull.

Badger sets sights on VARs to sell "rugged" computers. Computer Reseller News, Oct. 25, 1993, p. 124 by Eric Hausman.

SPARS—State Permitting and Air Reporting System, "How Will Electronic Permitting Help Industry, Citizens and the DNR?" http://www.dnraq.state.ia.us/spars_pages/help.htm.

SPARS—State Permitting and Air Reporting System, "SPARS Frequently Asked Questions (FAQ)", http://www.dnraq.state.ia.us/spars_pages/faq.htm.

SPARS—State Permitting and Air Reporting System, SQL Anywhere User's Guide, Version 2.07 by Windsor Technologies, Inc. for the Iowa Department of Natural Resources.

Georgia Tech Video: Integrated Optic Sensor May Soon Revolutionize Chemical Testing. Optical Materials & Engineering News, vol. 4, No. 2, Oct. 1993.

Information Technology Seen Key to Cutting New Nuclear Plant Costs, Nucleonics Week, vol. 41, No. 16, p. 2, Apr. 20, 2000.

Portable Maintenance, Dilger, Karen Abramic, Manufacturing Systems, vol. 15, No. 12, pp. 20–22, Dec. 1997.

Pen PC's Power Gas Company, John Longwell, Computer Reseller News, No. 628, pp. S15–S16l. May 1995.

Computerized Applications in Composting and Recycling. David Riggle, Biocycle, vol. 43, No. 3, pp. 60–63, Mar. 1993.

* cited by examiner

FIG. 3Ciii

| NJID # | Facility Designation | Facility Description |
|---|---|---|
| E-1 | Bulk Ex. A | Bulk Ex. A |
| NJID # | Facility Designation | Facility Description |
| CD-3 | Bulk Ex. A | Bulk Ex. A |
| NJID # | Facility Designation | Facility Description |
| U-1 | Bulk Ex. A | Bulk Ex. A |
| NJID # | Facility Designation | Facility Description |
| PT-1 | Bulk Ex. A | Bulk Ex. A |

SECTION D: Permitting Scenarios
Registration under this General Permit is for single or multiple pieces of bulk solid materials receiving and storage equipment which connect to single or multiple control devices venting to one or more common stacks. (Note: See instructions for example and illustrations.)

SECTION E: Certification
"I certify under penalty of law that I believe the information provided in this document is true, accurate, and complete. I am aware that there are significant civil and criminal penalties, including the possibility of fine or imprisonment or both, for submitting false, inaccurate or incomplete information."

Individual with Direct Knowledge     Date

"I certify under penalty of law that I have personally examined and am familiar with the information submitted in this document and all attached documents and, based on my inquiry of those individuals immediately responsible for the obtaining the information, I believe that the submitted information is true, accurate and complete. I am aware that there are significant civil and criminal penalties, including the possibility of fine or imprisonment or both, for submitting false, inaccurate or incomplete information."

Name of Responsible Official     Date ( Modify Permit )  ( Back to Application Folder )

208

FIG. 3Diii

NJ DEP EXCESS EMISSIONS REPORT

MERCK & CO INC

VI. CMS EXCURSIONS

EMISSION EXCEEDANCE INFORMATION

| 1 EXCEEDANCE DATE/TIME | | 2 | 3 PERMIT ALLOWABLE | | 4 | 5 | 6 | 7 |
|---|---|---|---|---|---|---|---|---|
| START | END | EMISSION OR PARAMETER | LOWER BOUND | UPPER BOUND | UNITS | AVERAGING TIME | DURATION (HRS) | EMISSION OR PARAMETER READING |
| | | | | | | | 0:00 | |
| | | | | | | | 0:00 | |
| | | | | | | | 0:00 | |
| | | | | | | | 0:00 | |
| | | | | | | | 0:00 | |
| | | | | | | | 0:00 | |

| 8<br>PERCENT DEVIATION FROM ALLOWABLE | 9<br>REMARKS |
|---|---|
| | |
| | |
| | |
| | |
| | |
| | |

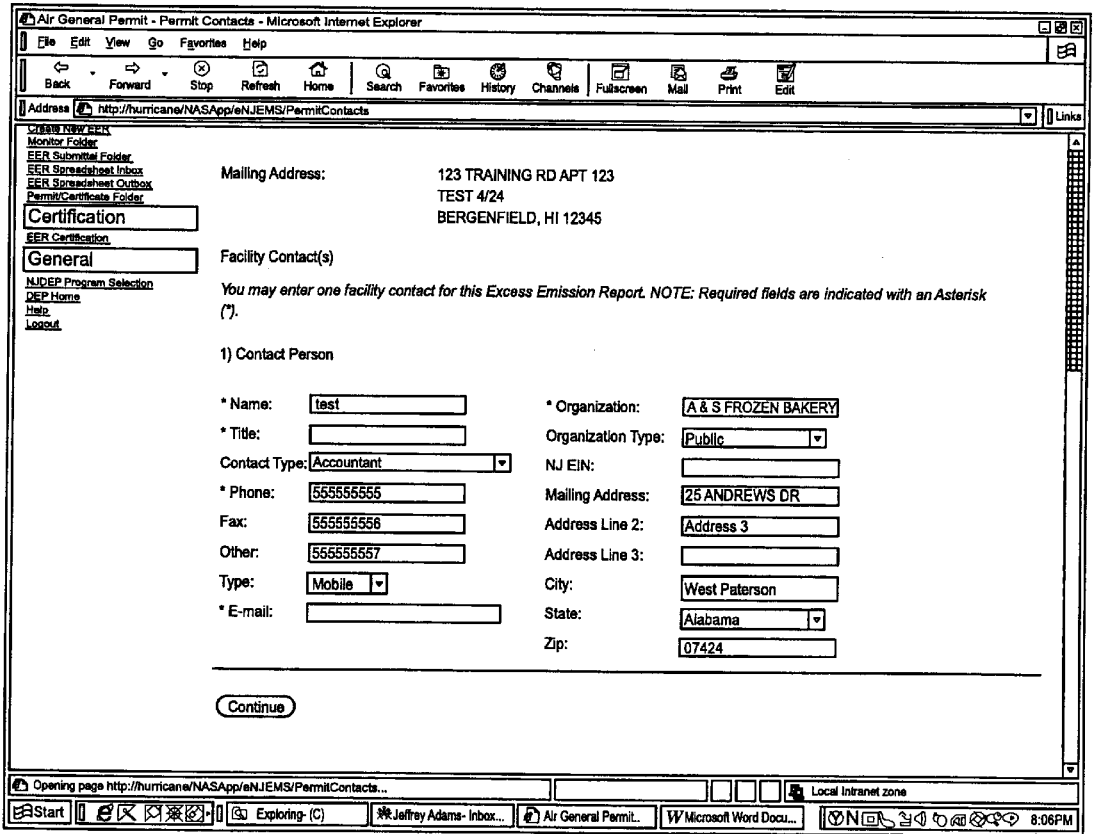
FIG. 6Aii

Excess Emission Report Monitor Selection for Marshall Einhorn's Air Training PI

| Select | Subject Item | Monitor ID | Parameter Monitored | Manufacturer | Model No. | Serial Number | Comments |
|---|---|---|---|---|---|---|---|
| ☐ | E 1 | 1 | Acetaldehyde | Acme | AJ-657 | 2 | Monitor Comment Test |
| | E 1 | 2 | Acetone | Acme | AJ-657 | 134 | Monitor Comment Test |
| | E 1 | 3 | Acetopheno | Acme | AJ-999 | 12355677 | Monitor Comment Test |
| | E 1 | 4 | Acetamide | Acme | AJ-999 | 4 | Monitor Comment Test |
| | E 1 | 5 | CO | Acme | AJ-657 | 13567 | Monitor Comment Test |
| | E 1 | 6 | Butane | Acme | AJ-999 | 1234 | Monitor Comment Test |
| | E 1 | 7 | Acetaldehyde | carbon dioxi | AJ-657 | 151235 | Monitor Comment |

FIG. 6Bi

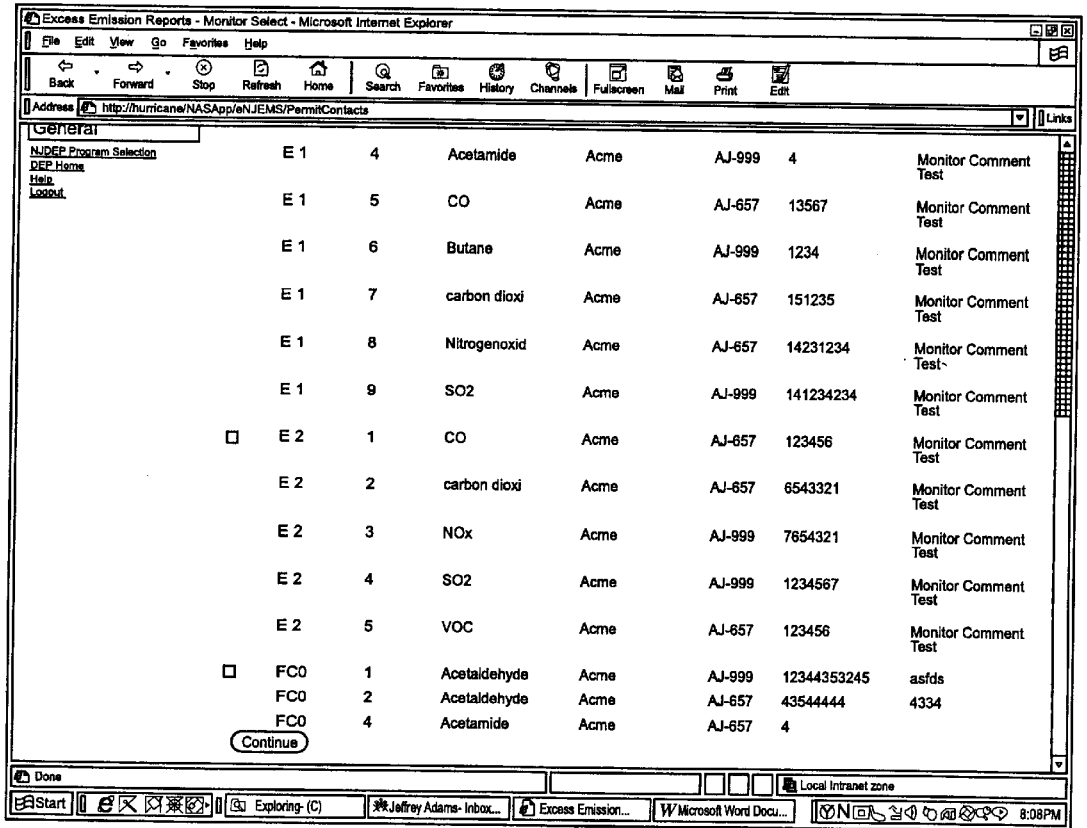
FIG. 6Bii

FIG. 7B

ENVIRONMENTAL PERMIT WEB PORTAL

CROSS REFERENCE TO RELATED APPLICATIONS

This application is related to U.S. application entitled System For Managing Regulated Entities having Ser. No. 09/528,718 by Smalley et. al, filed Mar. 20, 2000 and U.S. Pat. No. 6,067,549 both incorporated by reference herein.

This application is a Continuation of application Ser. No. 09/654,515, filed Sep. 1, 2000, now allowed.

BACKGROUND OF THE INVENTION

1. Field of the Invention

The present invention is directed to providing Internet access to and a data entry path for an environmental permitting, compliance, submittal, and enforcement system by remote users, such as regulated entities or regulating agency personnel and, more particularly, to a system allowing users to create, select, edit, complete, certify and pay for environmental permits, reports, registrations, questionnaires, surveys, certificates, applications as well to submit encrypted supporting electronic files and access to real-time facility-level and/or user-specific regulatory data.

2. Description of the Related Art

Compliance with environmental regulations by regulated parties has traditionally been a time consuming and tedious task. Prior systems and business processes particularly required complex paper forms, disparate review prior to submission, inaccurate manual data entry, numerous instructional or data-clarifying phone calls and often the exchange of re-submittal forms between regulated facilities and regulating agencies. While some compliance tracking software was located on remote PCs it was not electronically linked to other facilities or to the regulating agencies. Nor was there a central repository of real-time data that allowed browser independent web access from any client machine, whether at a regulated facility or at a regulatory entity.

What is needed is a system in which savings in both time and expense can be realized. For the regulators, administrative tasks previously done manually need to be automated, eliminating time-consuming processing and phone calls between entities. For the regulated, the industrial facilities' representatives need the ability to enter data for permits, reports, registrations, questionnaires, surveys, certificates and applications, including automated data validation, electronic signature and payment to thereby reduce data entry, processing costs, increase compliance, allow immediate agency approval and allow real-time management of a facility's compliance with applicable regulatory requirements. In addition, both regulators and the regulated need to manage environmental compliance in a proactive and timely manner through the utilization of advanced automated electronic messaging of upcoming compliance dates and the delivery of environmental documents for immediate review.

SUMMARY OF THE INVENTION

It is an object of the present invention to provide a system that allows users to access an environmental regulatory system over the Internet.

It is another object of the present invention to provide regulated users with a system that provides secure access and certification of facility-level and user-specific data through the automated administration of unique user identifications (user ID's) and encrypted personal identification numbers (PINs).

It is also an object of the present invention to provide regulated users with a system that provides secure access to edit centralized facility-level data that is used across electronic environmental submittals.

It is also an object of the present invention to provide regulated users with a system that provides secure access to edit electronic environmental submittals for a facility or facilities which are associated with the creating user.

It is another object of the present invention to allow users to create, select, edit, complete, certify and pay for initial, modified and renewed environmental permits, reports, registrations, questionnaires, surveys, certificates and applications.

It is also an object of the present invention to allow users to print completed or agency-awarded environmental permits, reports, registrations, questionnaires, surveys, certificates and applications for hard-copy records.

It is an object of this invention to facilitate more rapid decision making by regulatory agencies by allowing virtually instant access to data submitted by regulated entities.

It is a further object of the present invention to provide industrial entities with the ability to request and download partially pre-filled supporting electronic files for completion on the remote user's PC desktop.

It is an additional other object of the present invention to provide regulated users with the ability to validate, electronically lock and upload a read-only supporting electronic file, such as a spread-sheet, via the environmental regulatory web portal and for agency review.

It is another object of the present invention to provide regulated users with a streamlined workflow through the ability to remotely certify and pay for one or many environmental submittals at a time.

It is another object of the present invention to facilitate proactive environmental compliance management, regulator to regulated communication and timely submittal review through automated electronic messaging.

It is an additional object of the present invention to provide a central joint repository of real-time data that allows browser independent web access from any client machine, both for the regulator and the regulated.

The above objects can be attained by a system that allows remote regulated entity users to access, enter, edit and submit compliance data into an enterprise wide environmental management system of a regulating agency in real-time via a web browser over the Internet. The system can also validate submitted information in real-time. Submittal certification and fee payment can also be made electronically in real-time with a corresponding credit being made to the relevant facility-level account and corresponding general ledger account within the associated government financial system.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 depicts a facility profile screen which can be used to enter or update facility information that is used across electronic environmental submittals.

FIGS. 5A and 5B depict a spread sheet that can be submitted.

FIGS. 7A and 7B depict Internet application screens used for the downloading and uploading of supporting electronic files, such as a spread-sheet.

DESCRIPTION OF THE PREFERRED EMBODIMENTS

Figure 1:
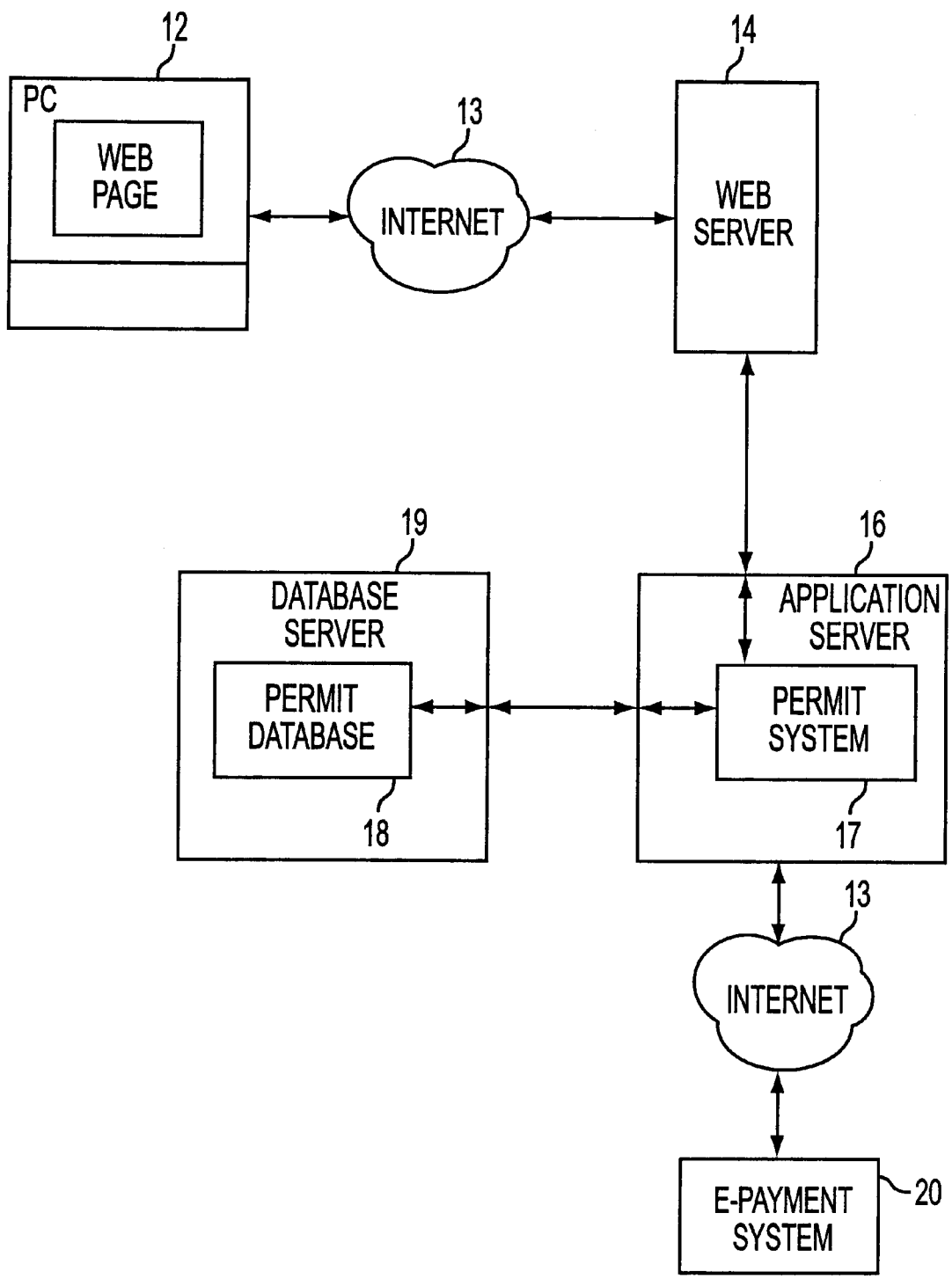
FIG. 1 illustrates the components of the system architecture of the present invention.
Figure 2A:
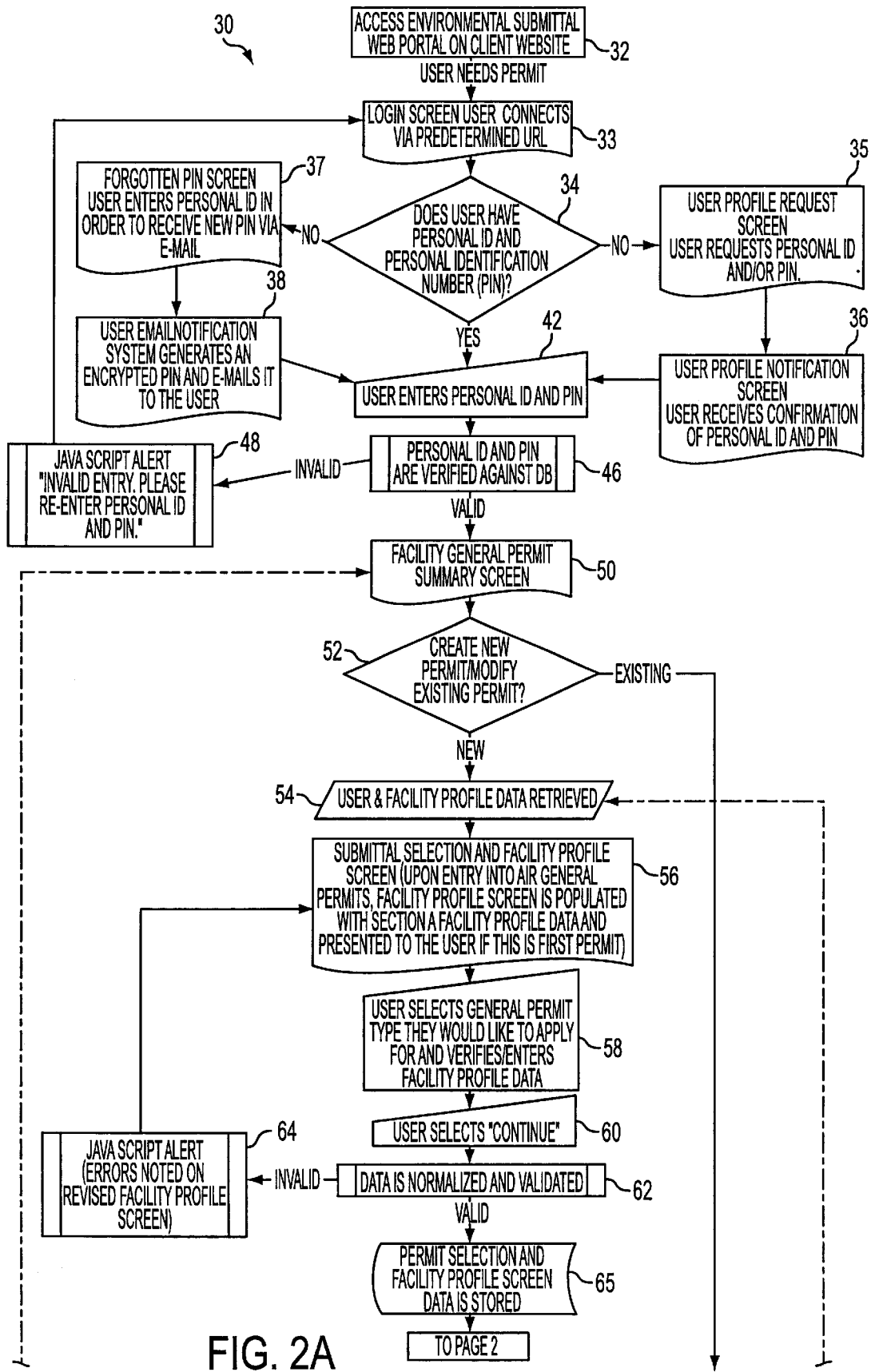
FIGS. 2A–2D depict the flow of operations performed in one aspect of the environmental submission process of the present invention.
Figure 2B:
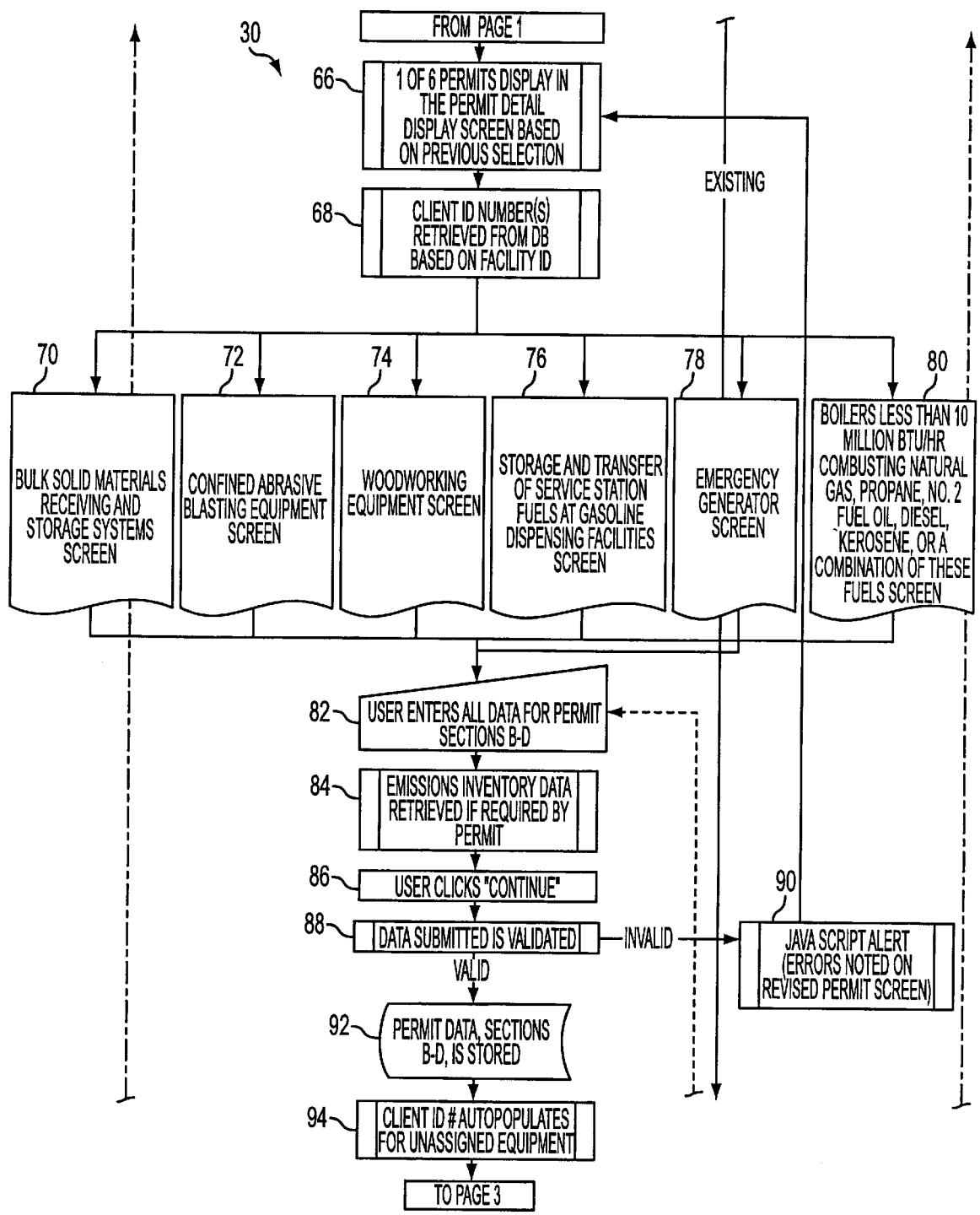
Figure 2C:
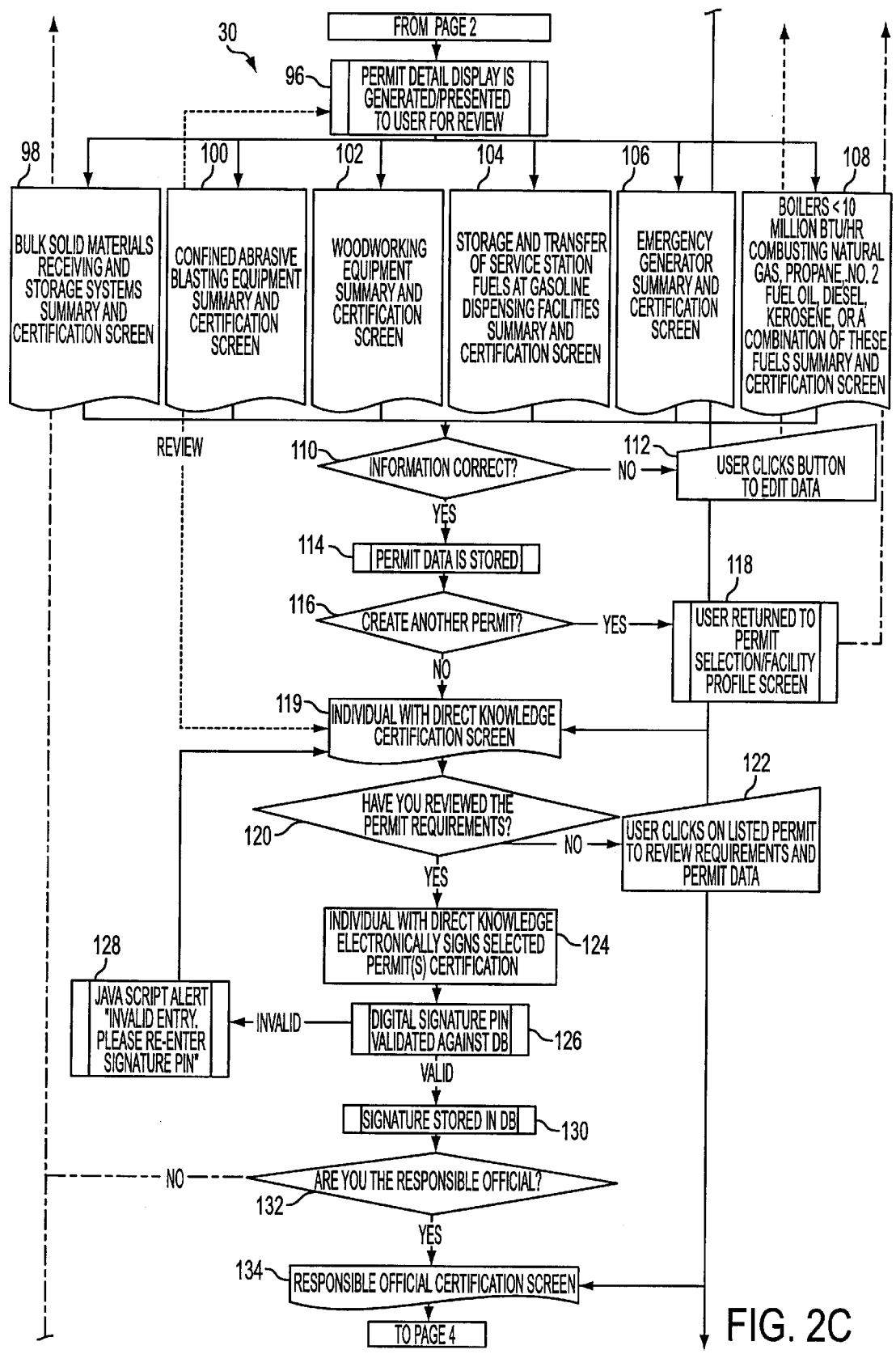
Figure 2D:
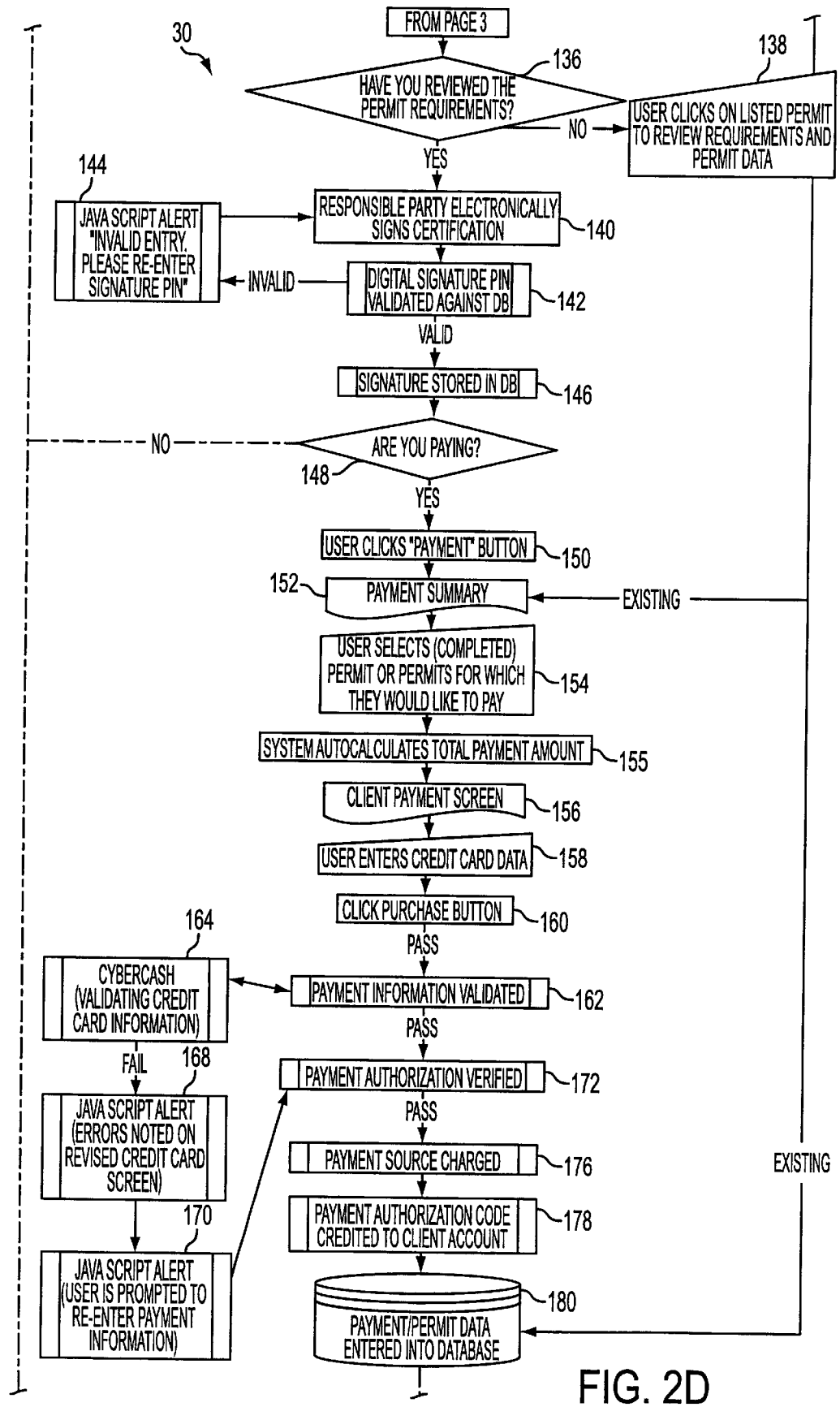

The present invention provides heightened, real-time communication between regulated facilities and the Federal, State, Regional, and Local Governmental organizations which have legal regulatory authority over these facilities. The invention allows regulated users to remotely access, create, digitally certify, electronically pay for and submit a permit, report, registration, questionnaire, survey, certificate and application for immediate compliance evaluation and approval. For both the regulated and the regulators the tool of this invention also allows access to the most current, up-to-date compliance and electronic submittal status information both at the facility and state levels. The system of the invention includes an environmental management system storing authorization data and a remote access system couplable to the management system allowing a recipient of an authorization remote access to the authorization data. The authorization data includes both submittals from the authorization recipient, as well as the data the authorizing organization has on-file. Authorization data includes one or more of the following: Permit/Registration Application Data; Registration Data; Questionnaire Data; Survey Data; Certificate Data; Sample Measurements, including both aggregate data (i.e., monthly averages), as well as individual sample results; Equipment Inventory Lists; Equipment Maintenance Records; Locational Data; Personnel Lists (including roles, responsibilities, licenses-held, and contact information); Compliance Data (including historical trend data); Financial Data (including bills and invoices for authorizations and penalties); Compliance Schedule Data (i.e., a list of due dates for submittals, renewals, inspections); Continuing Education Data (i.e., courses taken, certifications held); Site Plans (i.e., facility diagrams, CAD drawings); Emergency Response Plans; and Inspection Checklists and Results.

A purpose of the tool of the present invention is to streamline the transfer of data and compliance documents between regulators and their regulated clients. By using this tool, facilities will achieve increased efficiency as a result of reduced administrative time and costs, as well as increased data accuracy through on-line updating. Compliance should increase, and response time decrease by transmitting data on-line. The burden on the state and federal agencies to reply to clients via phone and paper will be drastically reduced, while their review process will be enhanced due to on-line, real-time access to current, accurate client data. The time required to issue permits will be drastically reduced by eliminating reliance on paperwork and personal interaction.

Underlying the workflow, data entry and data access capabilities of this tool is the ability of a user to create unique User IDs and Personal Identification Numbers (PINs), which is encrypted, for each client to ensure secure access, digital certification and data integrity. Users can be limited to certain functions via the PIN. For example, only certain individuals can be granted permission to certify a permit. While agencies will have access to a facility's submitted data, they will not have the ability to alter that data in any way. The read-only status is achieved in two ways. First, the submitted electronic data is validated and migrated into the enterprise wide environmental management system of the regulating agency as locked data. Second, the supporting electronic files, such as a spread-sheet, is validated and locked on the regulated user's PC. The regulated user is provided a unique PIN allowing only regulated user access to edit and upload this supporting electronic file.

One of the purposes of the present invention is to streamline the entry and transfer of data relating to compliance documents between regulators and their regulated clients. To assist clients with an easy, quick way to update their facility "cover sheets" (e.g., name, address, contacts) that are included in every type of submittal or application, the invention includes a central repository for such facility profile level data. Therefore, a facility need only go to one place to update profile information, ensuring that the most accurate, up-to-date information is disseminated to other industry representatives at a facility and this current information is utilized across electronic submittals. This is also an effective time-saver, as the information need only be updated once each time a change is required.

Other important features of this tool, described later herein, include a complete document processing life cycle on-line through a web-browser, real-time submittals to live production databases and on-line renewals of environmental compliance documents, including certification and payment.

Additional important features include proactive environmental compliance communication and management through automated electronic messaging. For example, the system automatically sends an electronic message to a facility representative with upcoming key expiration dates, renewal fees and renewal instructions. Additionally, the system automatically reminds a user through electronic messaging when they have failed to submit the legally mandated supporting documents such as a hard-copy of a facility site plan. Facilities can also correspond with the agencies via the web and the resulting distribution of an electronic message to an agency representative to share information regarding facility data that is necessary to finalize prior to the submission of a submittal for a new facility.

The ability to include payment with on-line permit renewal is important, as it utilizes the use of electronic signature and bank authorization, thereby eliminating paperwork and time lags inherent in a paper system. Not only is the electronic signature unique, but it can be used in a very time-effective manner by allowing multiple approvals and payment by an approver at one time. Payment is achieved through a system interface with a payment system, such as that provided by CyberCash, Inc. of Virginia, which executes electronic payment transactions with a credit card authorization company.

The ability to submit electronic files in support of data entered over the web is important, as it utilizes central repository to data to jumpstart a submittal, but it also provides a regulated user with the ability to provide more data intensive submittals in a manner that is secure from manipulation by a regulatory agency prior to final submission. Through this tool, facility representatives can send requests for pre-populated files, such as excess emissions report (EERs) forms. The electronic submittal portal can then quickly generate a customized spread-sheet for each facility on demand and provide facility-level monitor and equipment data that is up-to-date. This system allows for more rapid data entry that is validated and is a quick transmission of read-only information that, when married with a facilities' ability to update all of their company data on-line at any time, ensures current information on any facility is accessible to any organization at all times. This saves the client or regulated entity valuable time previously spent completing forms manually, and eliminates possible data entry errors.

The present invention software is preferably deployed as a four-tier application system 10 as depicted in FIG. 1. Each of these tiers is described below.

In order to access the software, a permit applicant will typically use a conventional personal or desktop computer 12 located at the regulated entity site or under the regulated entity's control, and running an industry-standard web browser (either Netscape Navigator or Microsoft Internet Explorer) or a mobile or wireless device with web-browsing capability. The user interface is preferably written in HTML and implemented without using vendor-specific additions to the standard HTML to support access from as many types of browsers as possible. Although some permit applicants may have a direct connection to a packet switched network, such as the Internet 13, (via a corporate network), it is expected that many applicants will be connecting to an Internet service provider (ISP) via a modem or wireless connection. Because of the limited speed supported by most modems and wireless connections, the permits software is preferably light on graphics and other web page items that would require longer download times. To support encryption of Personal Identification Numbers (PINs) and credit card information, permit applicants use a Secure Socket Layer (SSL) connection when submitting PINs and credit card information.

A conventional web server 14, typically located at or under the control of the regulating agency, is accessible from outside of a firewall (on the Internet 13) but will have permission to communicate with the application server 16 (located inside the firewall). This web server 14 can be shared with other web sites and applications hosted by the regulating agency. The web server 14 preferably runs the Sun Solaris operating system and Netscape Enterprise Server 3.61 web server software. The web server is configured to support SSL transactions to ensure that private information, such as an applicant's PIN, is encrypted while being transmitted.

It is the job of the application server 16, typically located at or under the control of the regulating entity, to communicate between the web server 14 and a joint usage database 18 located on a database server 19. The application server 16 takes requests from users, accesses information needed by the users within the database 18 and sends that data to the web server 14 to be formatted into a web page. This web page is sent to the PC 12. All business logic for the web based environmental permitting system 17 resides in the application server 16 and in the database 18. The permitting business logic is provided by the TEMPO system available from American Management Systems, Inc. of Virginia and described in the related documents noted above. The code for the access and execution logic, which will be described in more detail later herein, is preferably written using the Java programming language and supports the Java 2 Enterprise Edition (J2EE) and Enterprise Java Beans (EJB) standard. Connections from the application server 16 to the database 18 are using native Oracle (SQL*Net) drivers. The application server 16 preferably runs the Sun Solaris operating system, as well as Netscape Application Server 4.0. The application server 16 conventionally communicates with the preferred e-payment mechanism/system 20 to allow for payment of permit fees, etc. via credit cards, etc.

A database server 19 is used to facilitate storage and retrieval of all permitting information from the database 18, which is preferably an Oracle database. The database 18 stores the data of the permits as well as other regulatory information, ID information, facility related information and supporting electronic documentation, as discussed in more detail below.

Although the application server 16 and web server 14 have been depicted as being two different machines, it is possible to have web server operations and application server operations being performed in the same machine. It is also possible for the database server operations to also be included in such a multi-task machine. However, it is preferable to keep the web server distinct from other servers for security reasons.

Figure 3A:
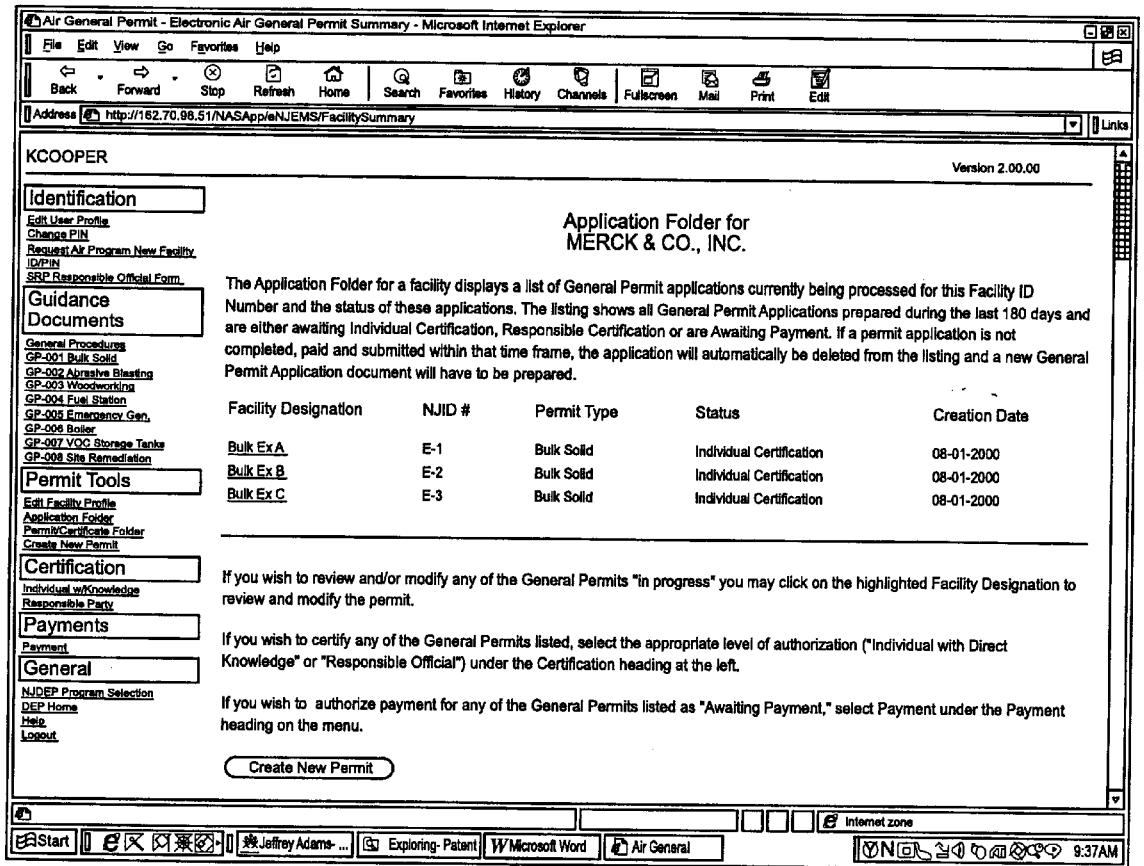
FIGS. 3A, 3B, 3Ci, 3Cii, 3Ciii, 3Civ, 3Cv, 3Di, 3Dii, 3Diii, 3Ei, 3Eii, 3F and 3G illustrate graphical user interface screen displays used in the present invention.

The flow of operations 30 performed in the present invention, as depicted in FIGS. 2A–2D, begins with the user accessing 32 (FIG. 2A) the permit web site using a known URL and the users conventional web browser on the PC 12 when the user needs to initiate, modify, certify or print an electronic environmental submittal. The web site returns 33 a log on screen (not shown). If the user does not have 34 a personal user ID and a personal identification number (PIN), an ID and PIN request screen is provided 35 and the appropriate identifiers are provided 36. If the user has a personal user ID but does not remember their PIN, a screen allowing the user to request the PIN is provided 37 and an e-mail message is sent 38 which includes the PIN. Each user selects their own user ID and PIN, and the system checks them for uniqueness. If the user does have a user ID, the user can enter 42 personal ID and user's PIN and submit this data. The user ID, etc. entered are conventionally passed back to the web server 14 as HTML data which conventionally is converted for use by the application server 16 which accesses the database 18 to verify 46 the IDs. If the IDs are not valid, an HTML screen is returned to the PC requesting corrective reentry of the IDs. If the IDs are valid, the application server 16 accesses the database server 19 to obtain the list of permits for the user's facility by making standard queries for this information and prepares 50 information for a permit summary screen 202 (see FIG. 3A) which is presented to the user at the PC 12 by the application server 16 through the web server 14. The web server 14 converts the screen information provided by the application server 16 into a conventional HTML web page. The user is then given 52 the opportunity to edit, certify, pay and print an existing permit or create a new permit.

Figure 3B:
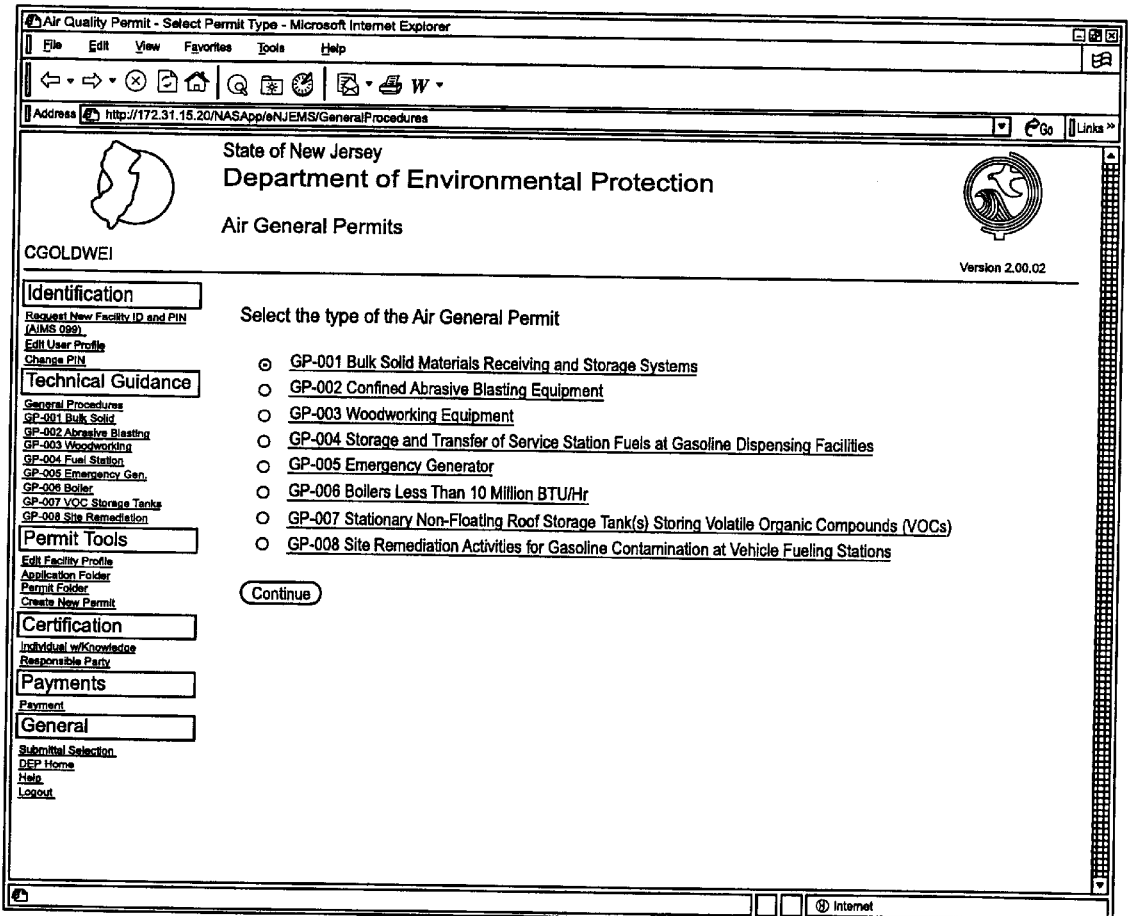

If the user is creating a new permit, the application server 16 accesses 54 the database server 18 for the list of valid permit types and provides 56 the PC 12 with a selection screen 204 (see FIG. 3B). The user selects 58 the type permit and enters the facility data followed by a selection 60 of the continue button. The selections of the screen are provided to the application server 16 via the web server 14 and the selection is validated. Also addresses are normalized 62 to U.S. Post Office standards. If the data entered is not valid another HTML screen is sent 64 to the PC 12 by the application that notes errors and allows reentry of the data. If the data is valid it is stored 65 in the database 18.

Figure 3:
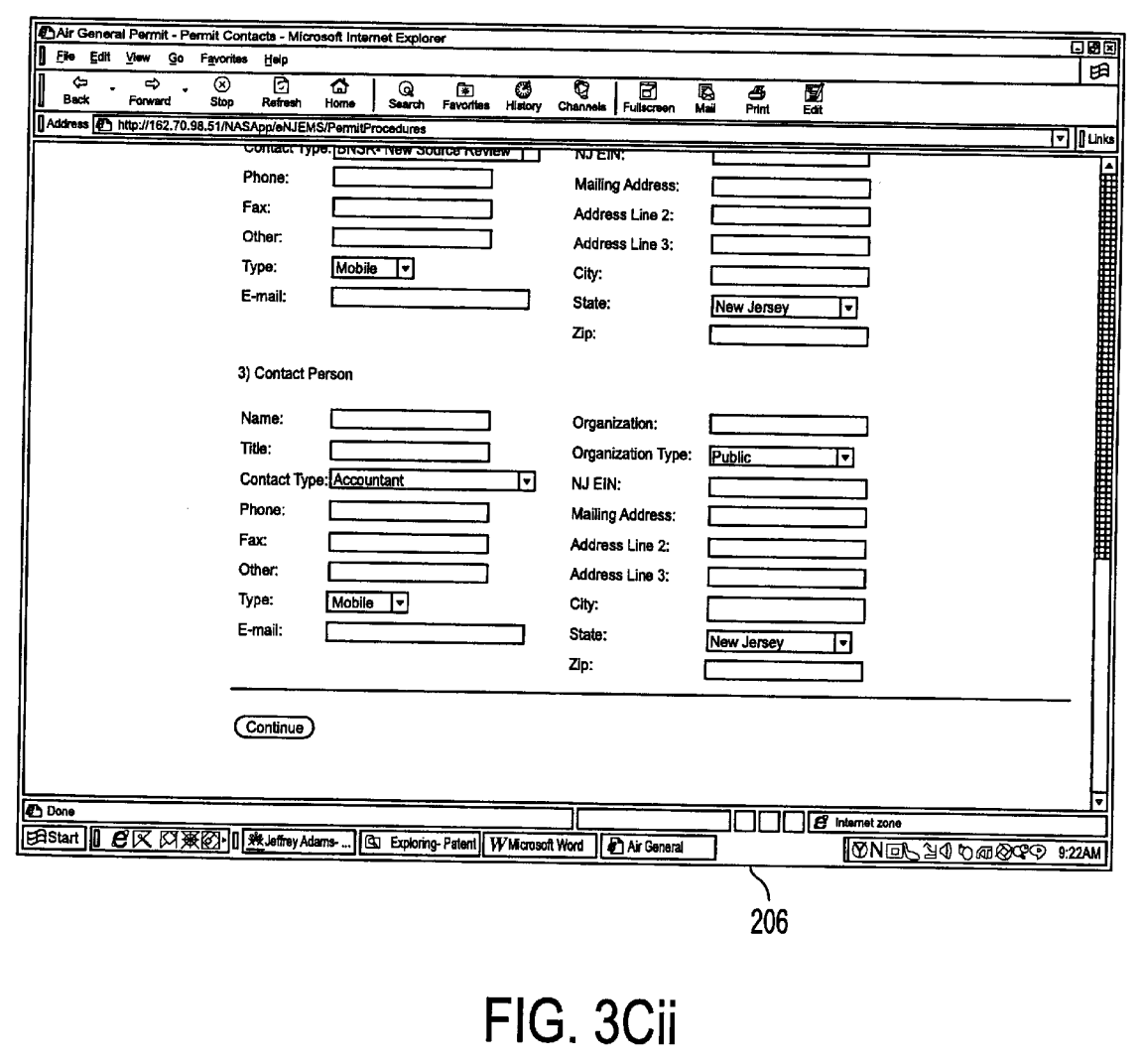
Figure 3:
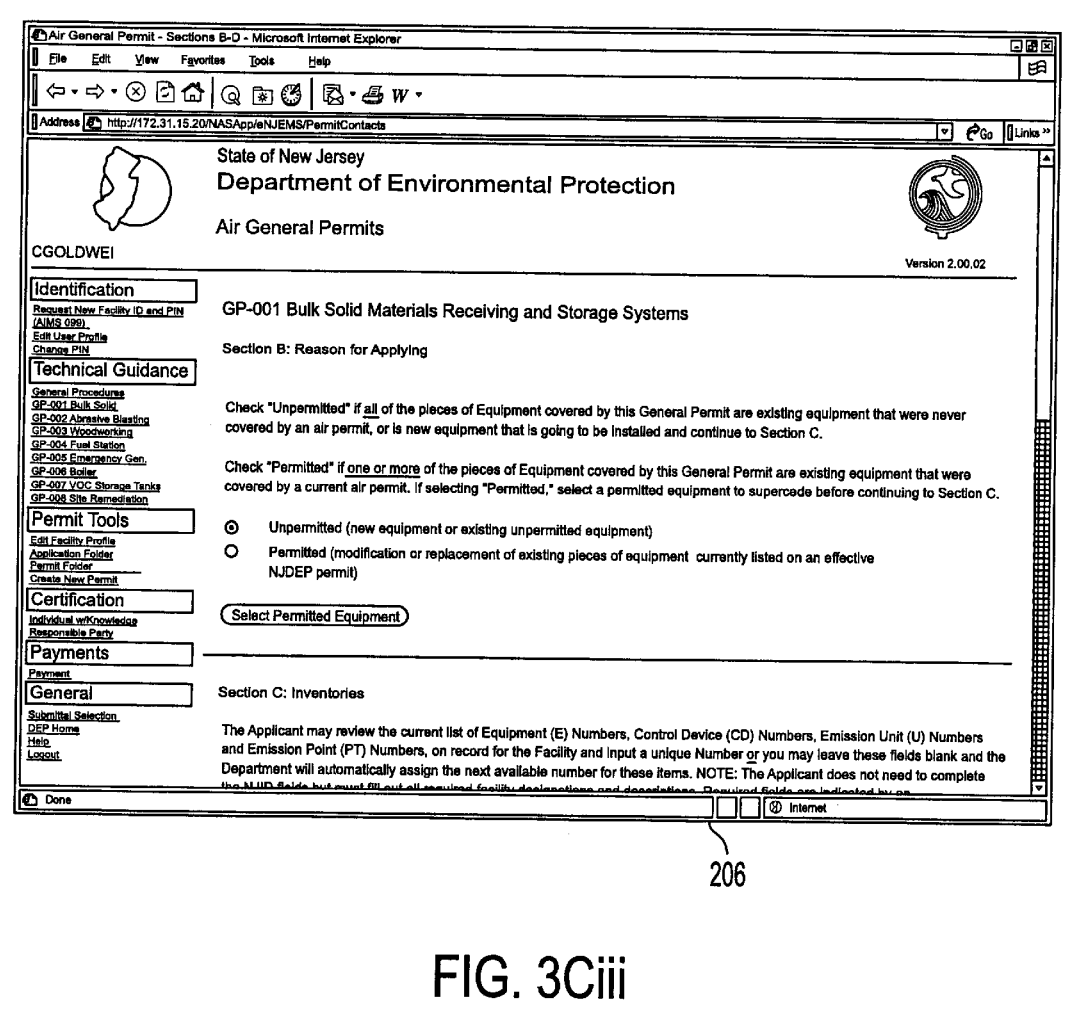
Figure 3:
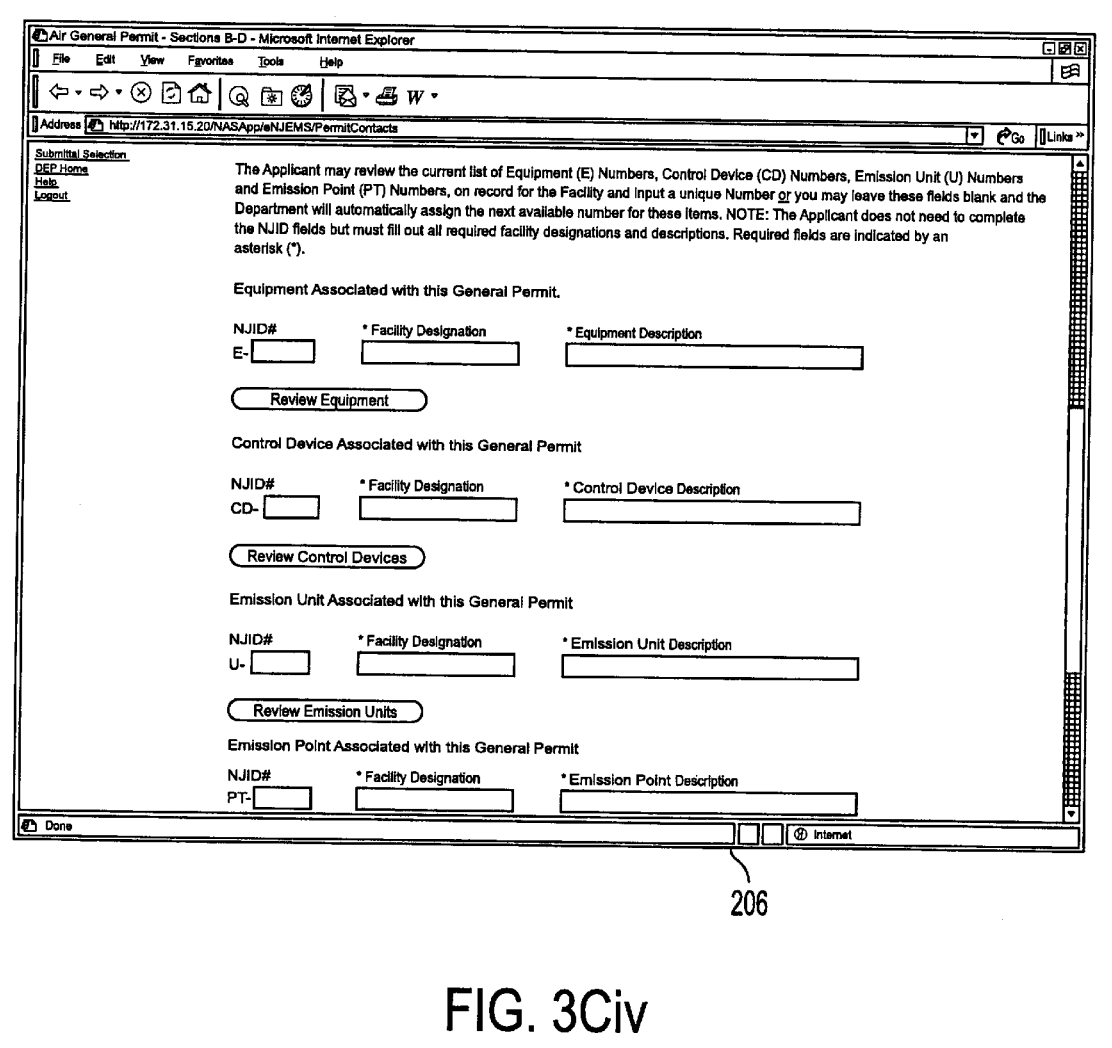

The application server 16 (see FIG. 2B) then uses the previous selection information to display 66 one of the possible permits and retrieves the facility information from the database 18. The permit data from among the types with the relevant information, is produced by the permitting system, such as TEMPO previously mentioned, and then provided (70–80) to the PC 12 via conversion into a web page. An example of the bulk solid materials receiving and storage systems permit screen 206 is shown in FIGS. 3Ci–3Cv.

The user then enters 82 the data needed for each of the sections of the permit. The system retrieves 84 the emissions data associated with the submittal being applied for and associates this emissions data with the submittal during the migration process. This data is typically fixed limitation type data that specifies the limitations/requirements within which a piece of equipment or a facility must be operated. The user may review this data on a static HTML screen (see FIGS. 3Di–3Diii) and for example, decides whether the company can abide by the permit requirements. If not, the user can exit the electronic environmental submittal and/or close the web browser. If so, the user completes any missing data then activates 86 the on screen continue button, the data is sent back to the application 17 where it is validated 88 by the system. For example, if a user initially did not provide equipment description data required by the system the application indicates that this data is missing. Once this data is provided the system then re-validates the permit data upon clicking the continue button. If all data is valid the system saves the data to the web application database. If the data is not valid a Java script in the PC 12 is activated 90 to note errors and loop back for data reentry. When the data is valid it is stored in the database 18.

Figure 3D:
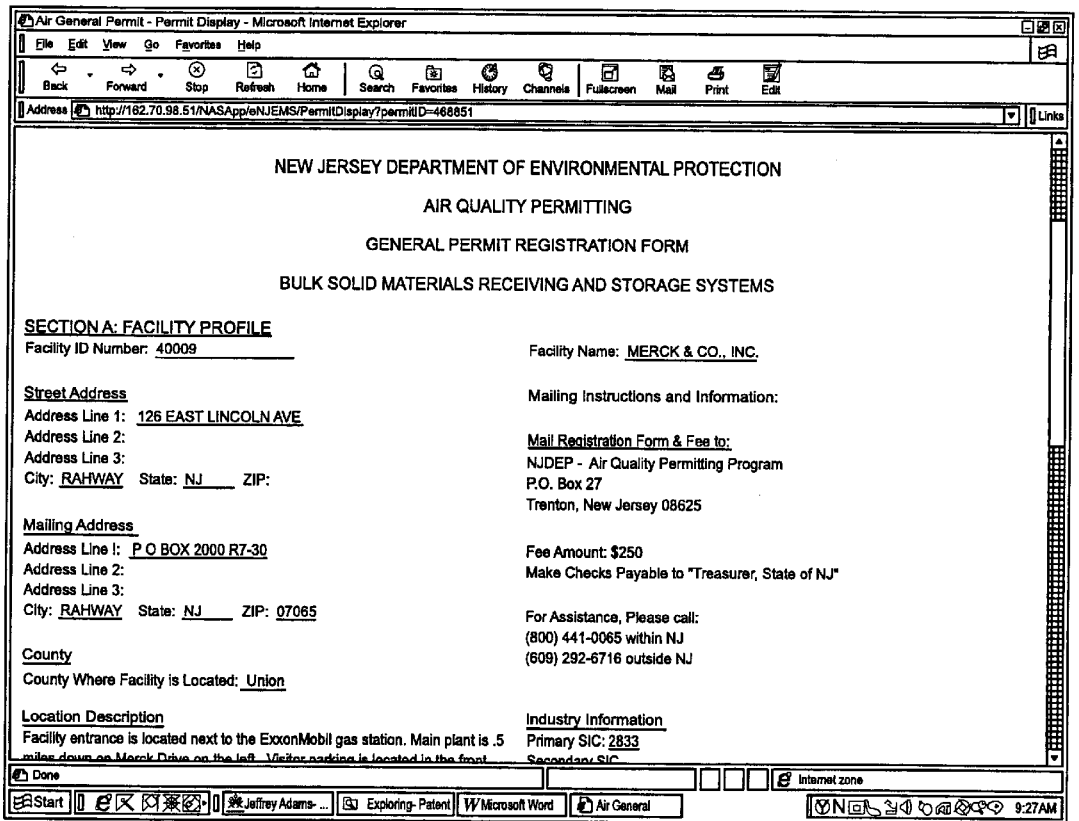
Figure 3:
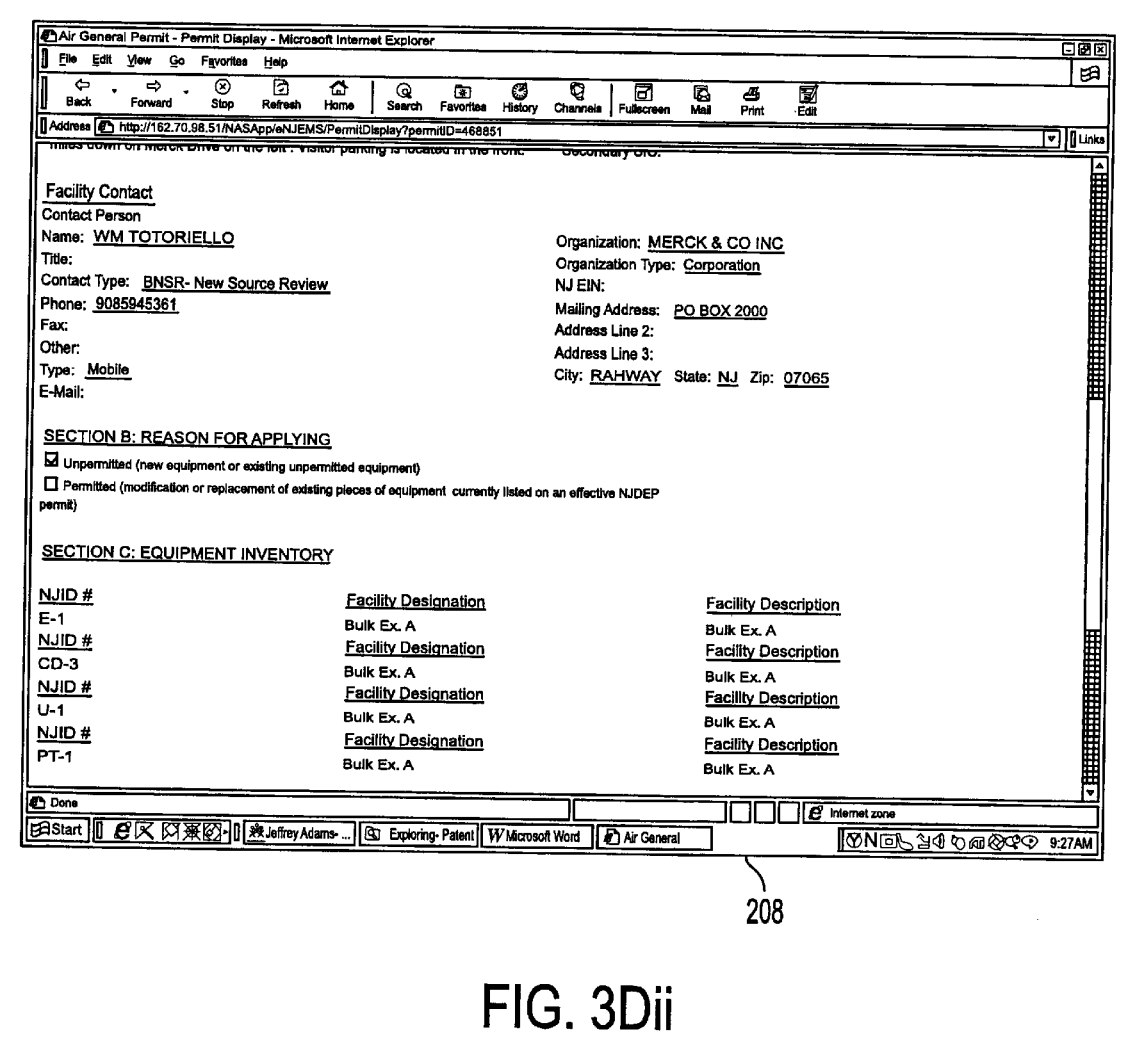

Next, the screen display is automatically populated 94 with unassigned unique equipment numbers and a permit detail screen 208 is prepared 96 (see FIG. 2C) by the environmental permitting system and presented (98–108) to the user (see FIGS. 3Di–3Dii). The user, at the PC 12, reviews 110 the details of the permit and, if the data is not correct, makes edits 112 and returns to entering the permit section data 82. When the data is correct, the data is submitted and stored 114 in the database 18 by the application 17. The user can then chose 116 to create another permit and is returned 118 to the screen 204.

Figure 3:
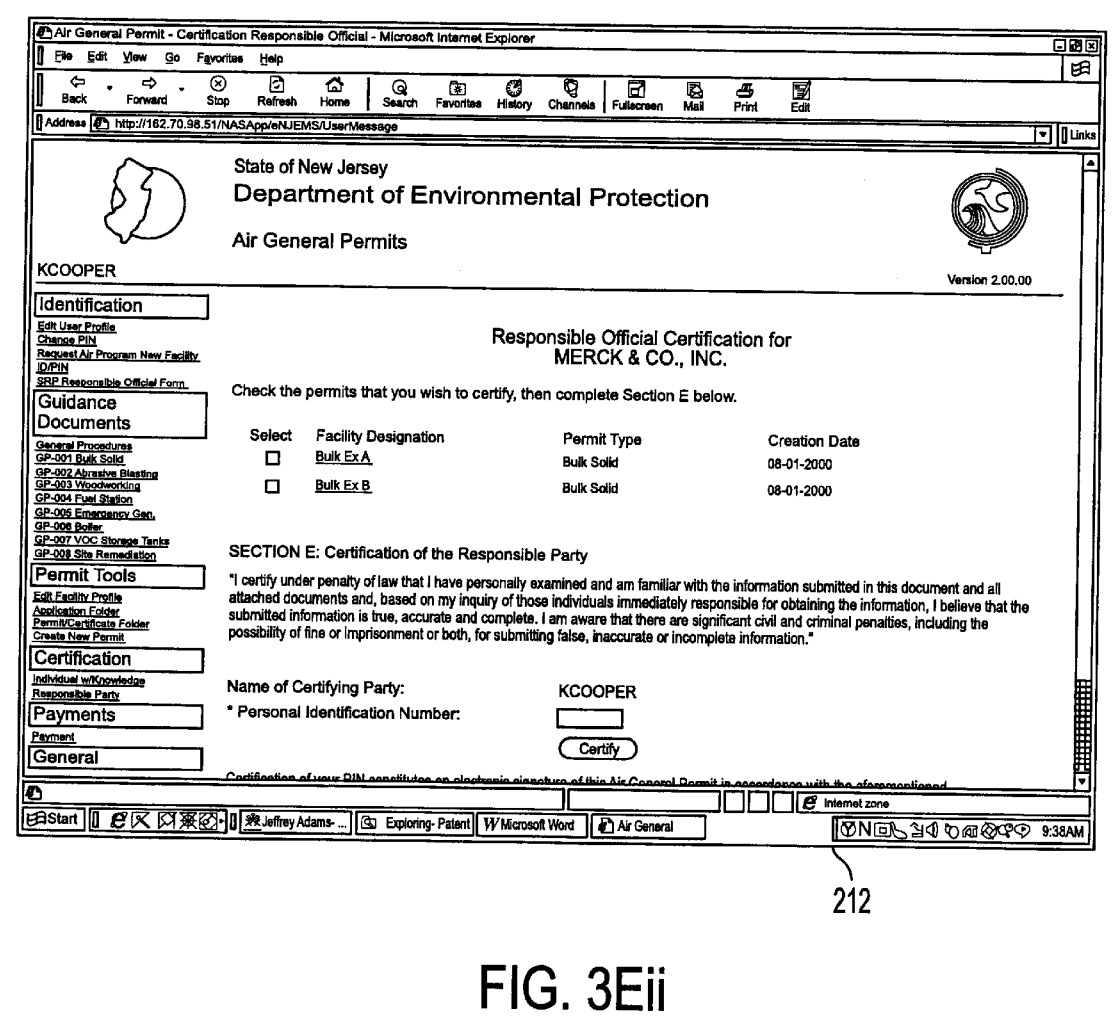

If the user has finished creating permits, the user is presented 119 with an individual certification screen 210 (see FIG. 3Ei). The system, prepares this screen by determining from the database all of the uncertified permits (in this user's certification queue) that this user has created but which have not been certified. The user can also conventionally get to this screen directly via the menu on the left side of the screen. From this screen the user can also select 120 to review 122 one or more permits. Upon completion of the review 122 the user can re-enter the certification workflow via the menu on the left hand side of the screen. If the user has reviewed the permit and desires to certify this permit (or permits), the user enters the PIN electronically signing 124 the permit and submits the certification. The system then validates 126 at the application server level based on the signature using the database 18 to compare the entered PIN with valid PINs stored in the database 18 and initiates 128 a Java script message that indicates that it is an invalid PIN and displays the same certification screen with the PIN field highlighted to indicate an error and to allow PIN reentry. The valid signature is then stored 130 in the database for each submittal selected.

The system then queries 132 as to whether the individual is the responsible official. If so a second responsible official certification screen 212 (see FIG. 3Eii) for the official is presented showing all of the permits that are in the officials's queue. A responsible official may also access the responsible official certification screen at any point in the process through the web portal's menu. The official can select 136 (see FIG. 2D) to review 138 one or more of the permits. If the official has reviewed the permit and desires to certify it, the official enters his PIN electronically signing 140 the permit and submits the certification. The system then validates 142, at the application server level against the central data repository, the signature using the database 18 to compare the entered PIN with valid PINs stored in the database 18 and initiates 144 a Java script on the user's HTML page showing errors and allows PIN reentry. The official signature is then stored 146 in the database 18.

Figure 3F:
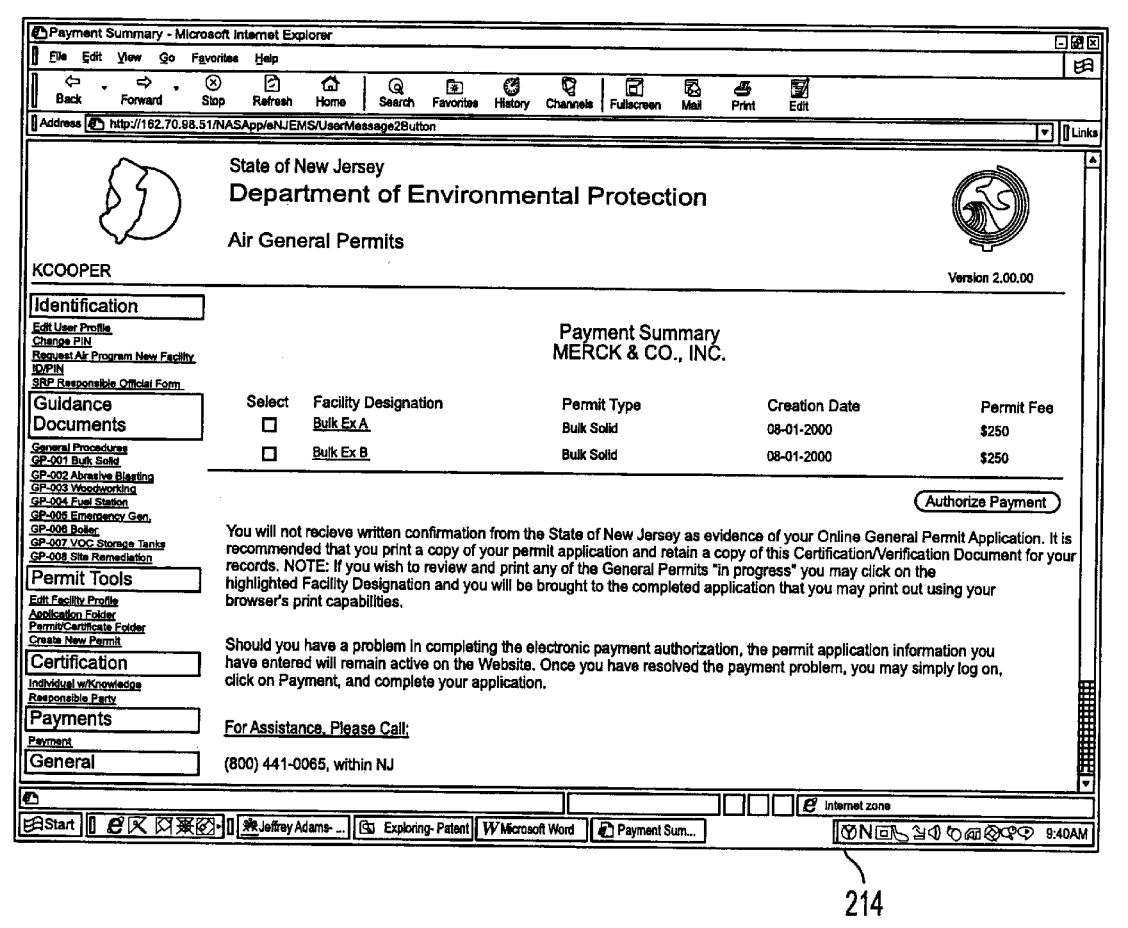
Figure 3G:
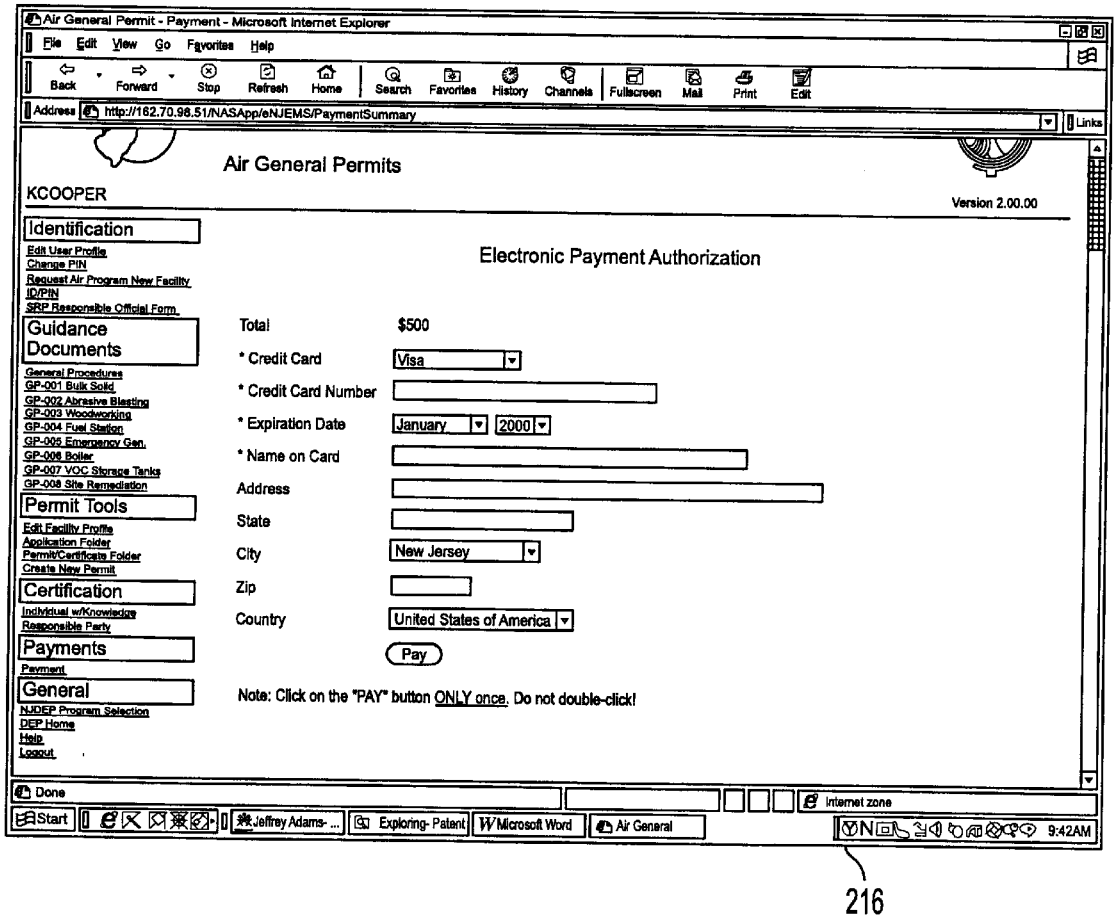

The system will also allow the user to pay the permit fees by giving the user the ability to select 148 the permit(s) to pay by activating 150 the payment button. The application 17, through the web server 14, presents 152 a payment summary screen 214 (see FIG. 3F). From this screen the user selects 154 the permit(s) for which fees will be paid and submits the selection. The system automatically calculates 155 the total payment amount by totaling the fees for each permit selected. Upon clicking the continue button the application 17 determines a total fee from the selected permits by accessing a fee list in the database 18 for the types of permits and the user is presented 156 with a payment authorization screen 216 (see FIG. 3G). The user enters 158 payment data, such as credit card number, and, when finished activates 160 the pay button of the screen which submits the payment data. The application then performs conventional operations to contact 162 a payment system 20, such as the CyberCash system previously mentioned, which validates 164 the payment information. For example, a user enters his/her credit card number, expiration date and name on card. This credit card information is transferred to the CyberCash system which validates this credit card information with a credit card processing company. If the user provides invalid credit card information the user is provided 168 a Java Script message and is allowed 170 to re-enter the credit card information. When the payment authorization information is verified 172, that is, upon successful completion checking of the credit information, the payment is charged 176 through the payment system 20, the returned authorization code and payment is credited 178 and 180 to the client account and the payment information is entered into the database 18. In addition at this point, although not shown, payments received for transactions processed through the web portal update the submittal record in the agency's general ledger system, such as the MOMENTUM FINANCIAL system available from AMS. The agency's enterprise wide environmental management system transfers a file to the state or federal general ledger system with all amounts and submittals paid and updated for that day. Each transaction will credit an associated revenue account, with the appropriate cross-references back to the posting transaction. The system will record the date, amount, and reason for the credit, as well as associated payment method information (i.e., credit card authorization number, or check number).

The system allows a user to edit an electronic submittal at any point prior to payment. For example, a user may access a permit off of the permit payment summary screen previously described and edit a permit through the previously described data entry screens. If a submittal is edited the submittal must be re-certified through the aforementioned certification process prior to payment.

Figure 4:
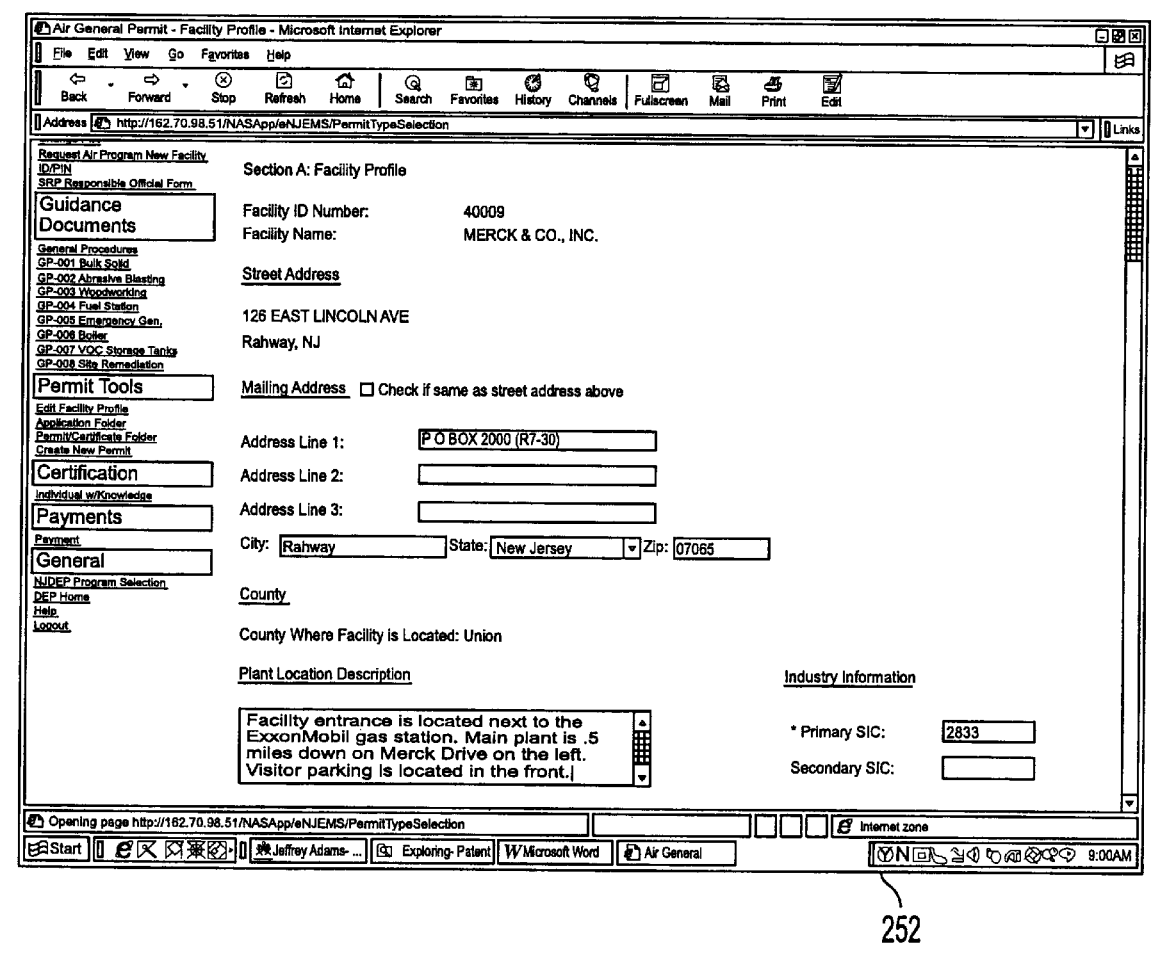

The system also allows a user to edit a facility profile using an edit screen 252, as shown in FIG. 4, and which can be selected directly from the screen menu previously discussed.

Figure 7A:
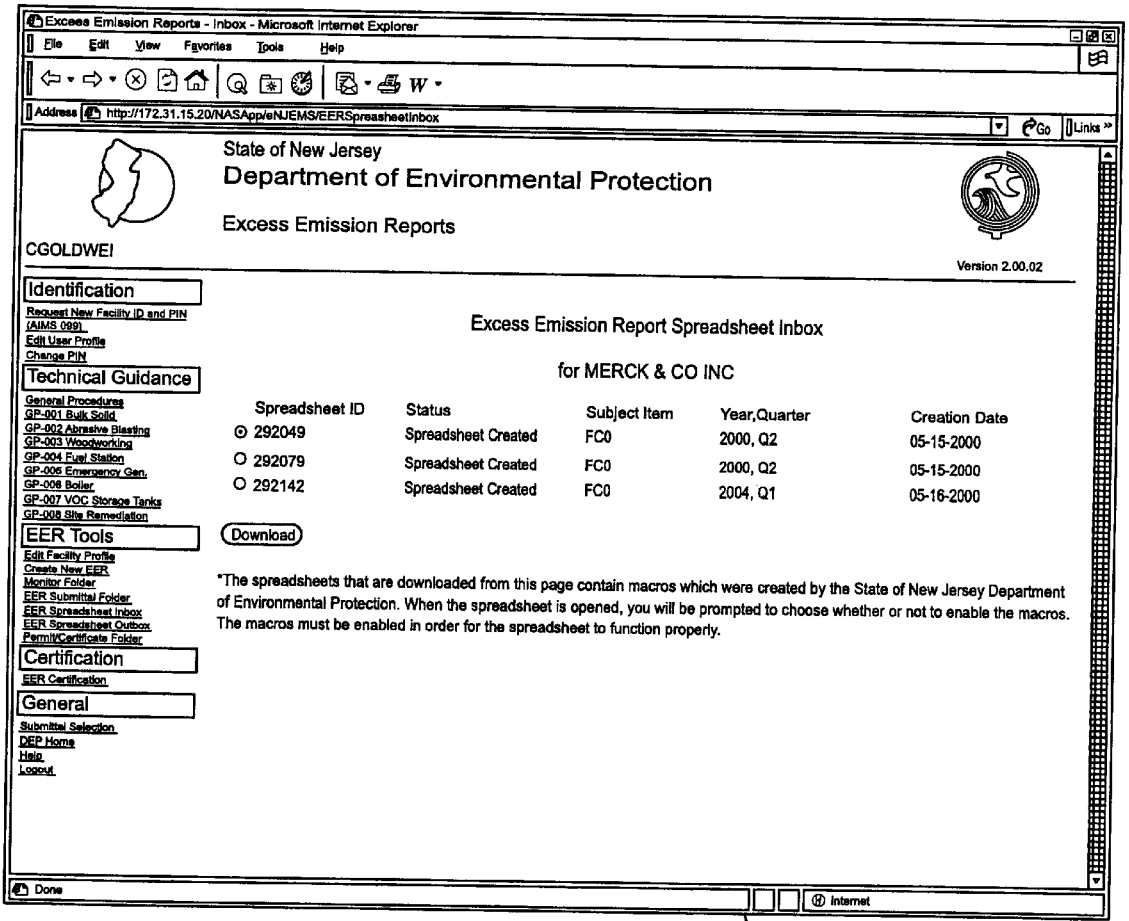
Figure 7B:
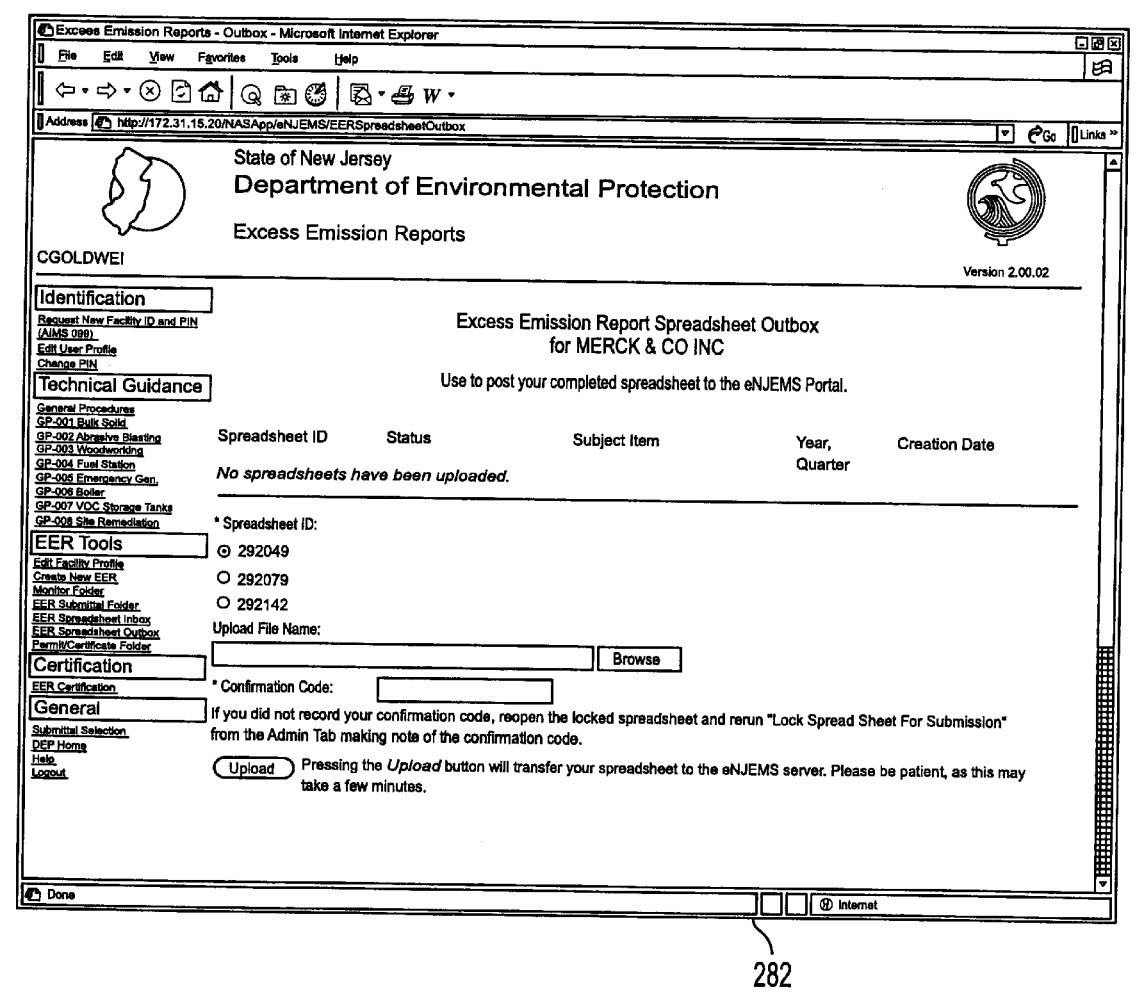
Figure 8:
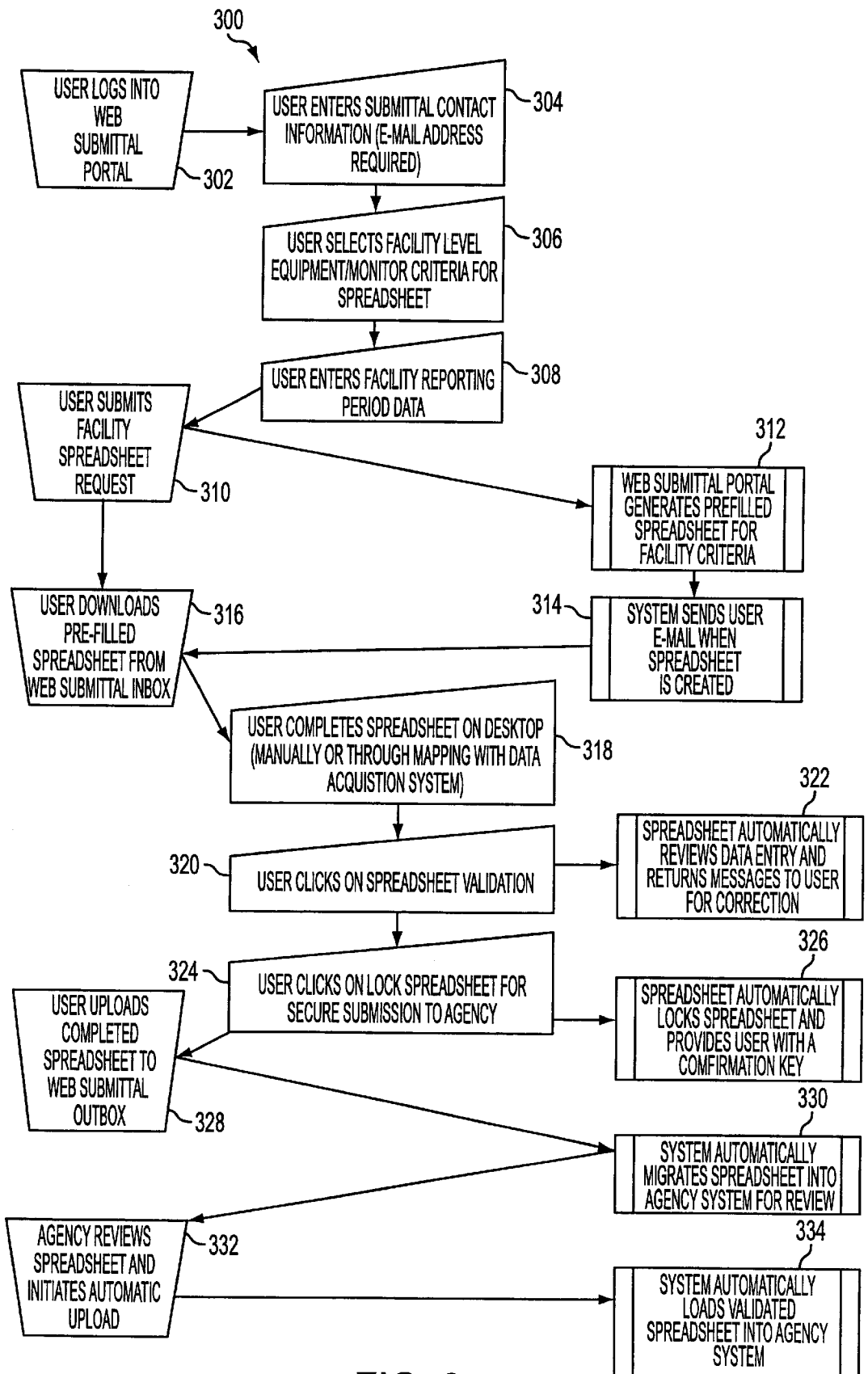
FIG. 8 depicts the flow of operations performed when requesting, downloading, completing, uploading and certifying an electronic file, such as a spread-sheet in support of an environmental submittal.

It is often the case that the permit process needs additional, more data intensive information that can be provided in the form of a supplemental electronic file, such as a spread-sheet. For example, a log of incidents where an emission has exceeded a permissible allowance, see FIGS. 5A and 5B for an example spread-sheet 262. The present invention allows for the downloading and uploading of such spread-sheets using web pages 272 and 282 as depicted in FIGS. 7A and 7B. The operations 300 involved in downloading, updating and uploading such spread-sheets are shown in FIG. 8.

Figure 6C:
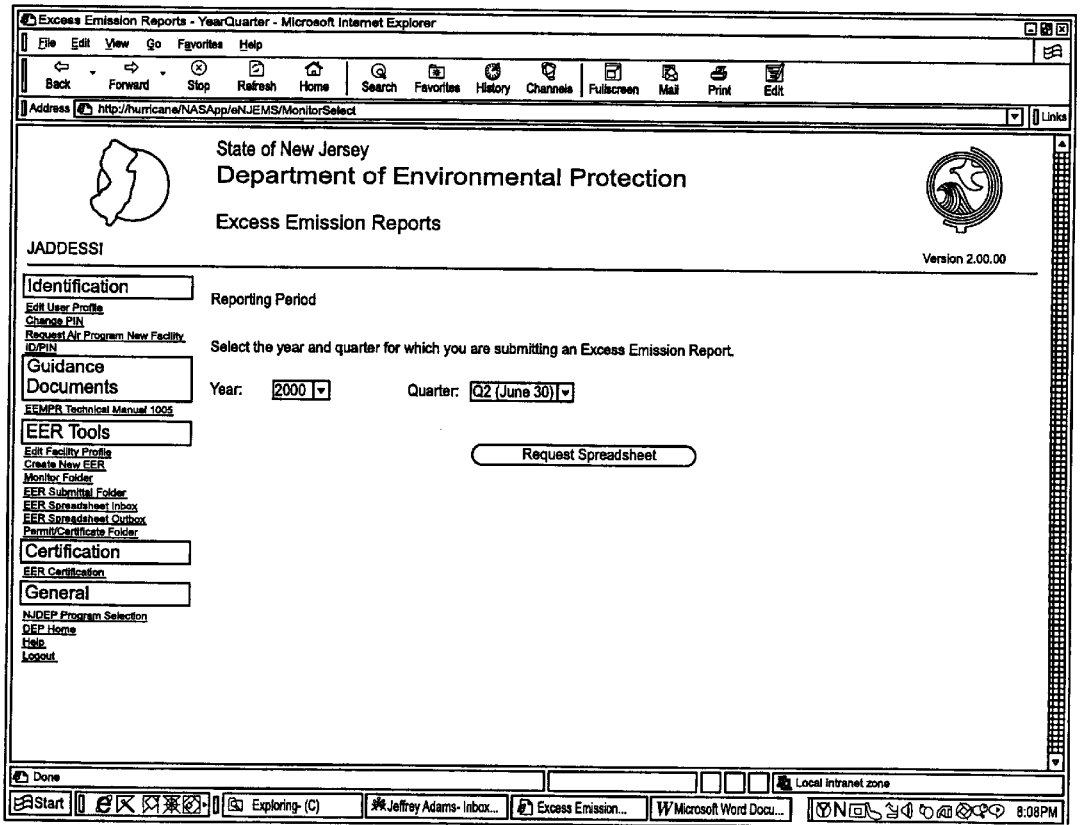
FIGS. 6Ai, 6Aii, 6Bi, 6Bii and 6C illustrate screens associated with a spread-sheet capable of being downloaded, completed or edited, and uploaded in another aspect of the present invention.

To begin a download of a spread-sheet that the user desires to update, the user accesses 302 (see FIG. 8) the spread-sheet submittal web pages (see FIGS. 6A–6C). In this page 264 the user enters 304 contact information, typically an address information including an e-mail address as depicted in FIGS. 6Ai and 6Aii, enters 306 facility and equipment identification information in page 266 as depicted in FIGS. 6Bi and 6Bii and enters 308 reporting period data in page 268 as depicted in FIG. 5C. The user then submits 310 the completed request to the application server 16 through the web server 14. Because the preparation of the spread-sheet can take a short period of time, the spread-sheet can be and typically is prepared at the server level and is "off-line" from the user's interaction taking place with the permitting system web site on the client machine. As a result, when the user submits the request, the user need not wait for the spread-sheet to be created and can do other things. Of course, it is also possible for the user to wait and refresh the application screens in real-time so that the user can have access to the spread sheet as soon as possible if desired. While the spread sheet is being prepared, the application server 16 accesses the database 18 in server 19 and generates 312 a pre-filled spread-sheet using the identifying information to obtain relevant data from the database 18. The application server 14 then sends 314 an e-mail message to the user indicating that the spread-sheet is completed and ready for down loading.

After the user recognizes that the spread-sheet is completed by reading the e-mail, the user logs back on to the system and opens 316 the download page (FIG. 7A) which lists the spread-sheets that are available for downloading. The user submits the down load request to the application server 16 by selecting the download button on the page and the spread-sheet is conventionally file transfer downloaded and opened. It is also possible for the spread sheet to be transferred to the user via e-mail.

The user updates 318 the pre-filled spread-sheet on his/her PC or mobile device. The advantage to this client level completion is secure data entry prior to submission for agency review. In addition, a user may distribute the supporting electronic file for completion by multiple users prior to uploading. Once the spread-sheet is completed a user requests 320 data validation. The validation of the spread-sheet insures that all required data is entered and that any data that does not meet regulatory standards is flagged as such. The user then initiates 324 a lock of the spread-sheet and the spread-sheet is automatically locked 326. The file is locked in a two-step process. The first step is that file is saved as a read-only file and the second step is that the file is locked with a unique, spread-sheet level code. This code is required for secure spread-sheet uploading onto the web portal.

Once the spread-sheet is locked, the user uses the up load page (see FIG. 7B) to submit 328 the spread-sheet to the application server 14 and the spread-sheet is transferred to the server 14 via a conventional file transfer. The application 14 migrates 330 the spread-sheet into an agency file review queue and an appropriate person the agency can open the file and review 332 the locked, read-only spread-sheet. Once the review is completed, the system loads 334 the updated sheet into the database.

An important feature of each screen is the menu on the left side. This menu provides the user with easy access to the screens most likely to be important to them, based upon facility and related individual security access stored in their user profile. This feature improves navigational capabilities and streamlines the use of the site for the user.

As described above, the tool of the present invention eliminates all manual administrative processing and paperwork by the regulating agency. With its built-in administrative checks, and the ability to submit securely directly into the regulated agency's enterprise-wise system, clients no longer must undergo a lengthy and burdensome paper-chase to provide the regulating agency with required data. Accessing enterprise information on-line gives clients the ability to update data quickly and frequently, thereby ensuring that facilities and agencies are always viewing current and accurate data, speeding up the approval process. Electronic certification and payment also drastically decrease turn-around time for approval by eliminating reliance on manual paper processing.

The present invention has been described with respect to environmental-streamlining the transfer of data and permit documents between regulators and their regulated clients as well as making payments therefor. The tool of the present invention could be applied to the creation, electronic certification, printing and payment of any kind of permit document (i.e. permit, application, report, certificate and/or standardized spread-sheet) for electronic submission and automated processing for any type of environmental, health and safety data for a facility. The on-line payment capability could also be applied to the payment of fees or penalties due to the enforcement actions of any regulatory agency or organization. In addition to the streamlining of the interface between industry and regulatory agencies the present invention could also be used on the Intranet for internal electronic submittals within an agency or within an industry client.

The present invention has been described as having the application server, etc. located at and under the control of the regulating entity. It is possible to have it located and under the control of others such as an independent entity sanctioned by the regulating entity.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A web portal system, comprising:

a computer implemented environmental management system storing permit data and compliance information and automatically validating the permit data, wherein the permit data comprises requirements within which a process, piece of equipment, or a facility is operated and the compliance information are reports comprising information to verify compliance with the requirements; and a computer implemented remote access system comprising a mobile or wireless device allowing a user remote access to the environmental system to obtain and comply with a permit, and to at least one of create, edit, and print the permit within the environmental system.

2. A process of a web portal system, comprising:

connecting with a computer implemented environmental permitting system; and electronically communicating environmental compliance management information for a permit and automatically validating the compliance management information, wherein the compliance management information are reports comprising information to verify compliance with permit requirements within which a process, piece of equipment, or a facility is operated.

3. A web portal system, comprising:

a computer implemented enterprise environmental management system storing permit, a registration, or a certificate and automatically validating the permit, the registration, or the certificate, wherein the permit, the registration, or the certificate comprises requirements within which a regulated client is authorized to operate; and a computer implemented remote access system couplable to the enterprise environmental management system allowing a user remote access to obtain and comply with the permit, the registration, or the certificate and allowing the user to create, edit, and/or print the permit, the registration, or the certificate within the environmental management system.

4. A web portal system, comprising:

a computer implemented environmental management system storing permit data and compliance information and automatically validating the permit data, wherein the permit data comprises requirements within which a process, piece of equipment, or a facility is operated and the compliance information are reports comprising information to verify compliance with the requirements; and a computer implemented remote access system couplable to the environmental system allowing a user remote access to obtain a permit, to track and/or print the permit, and to track compliance with the permit within the environmental system.

5. A process of a web portal system, comprising:

connecting with a computer implemented environmental permitting system;

electronically communicating environmental compliance management information for a permit;

automatically validating the compliance management information, wherein the compliance management information are reports comprising information to verify compliance with permit requirements within which a process, piece of equipment, or a facility is operated; and tracking and/or printing the permit within the environmental permitting system; and tracking compliance with the permit within the environmental permitting system.

6. A web portal system, comprising:

a computer implemented environmental management system storing permit data and compliance information, wherein the permit data comprises requirements within which a process, piece of equipment, or a facility is operated and the compliance information are reports comprising information to verify compliance with the requirements; and a computer implemented remote access system couplable to the environmental system allowing a user remote access to the compliance information to obtain and comply with a permit, and to automatically validate the compliance information.

7. A process of a web portal system, comprising:

connecting with a computer implemented environmental permitting system;

electronically communicating environmental compliance management information to obtain and comply with a permit; and automatically validating the compliance management information, wherein the compliance management information are reports comprising information to verify compliance with permit requirements within which a process, piece of equipment, or a facility is operated.

* * * * *

UNITED STATES PATENT AND TRADEMARK OFFICE
CERTIFICATE OF CORRECTION

PATENT NO. : 6,745,187 B2
DATED : June 1, 2004
INVENTOR(S) : Gary Brian Singer et al.

It is certified that error appears in the above-identified patent and that said Letters Patent is hereby corrected as shown below:

<u>Title page,</u>
Item [56], References Cited, OTHER PUBLICATIONS, insert
-- "Ending the Method 21 Paper Chase", Environmental Solutions, pp 30, June 1996 --

Signed and Sealed this

Twelfth Day of October, 2004

JON W. DUDAS
*Director of the United States Patent and Trademark Office*